United States Patent
Senarath et al.

(10) Patent No.: US 10,349,240 B2
(45) Date of Patent: Jul. 9, 2019

(54) METHOD AND APPARATUS FOR DYNAMICALLY CONTROLLING CUSTOMER TRAFFIC IN A NETWORK UNDER DEMAND-BASED CHARGING

(71) Applicants: Nimal Gamini Senarath, Ottawa (CA); Hang Zhang, Nepean (CA); Sophie Vrzic, Kanata (CA)

(72) Inventors: Nimal Gamini Senarath, Ottawa (CA); Hang Zhang, Nepean (CA); Sophie Vrzic, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/169,182

(22) Filed: May 31, 2016

(65) Prior Publication Data

US 2016/0353268 A1    Dec. 1, 2016

Related U.S. Application Data

(60) Provisional application No. 62/169,084, filed on Jun. 1, 2015, provisional application No. 62/222,340, filed on Sep. 23, 2015.

(51) Int. Cl.
*H04W 4/24* (2018.01)
*H04L 12/24* (2006.01)
(Continued)

(52) U.S. Cl.
CPC ........... *H04W 4/24* (2013.01); *H04L 41/5006* (2013.01); *H04L 41/5051* (2013.01);
(Continued)

(58) Field of Classification Search
CPC ..... H04L 47/14; H04L 12/14; H04L 12/1492; H04L 41/0893; H04L 41/0896;
(Continued)

(56) References Cited

U.S. PATENT DOCUMENTS 5,483,533 A    1/1996   Kuba
2002/0152319 A1   10/2002   Amin et al.
(Continued)

FOREIGN PATENT DOCUMENTS

CN    101374055 A    2/2009
CN    101562570 A   10/2009
(Continued)

OTHER PUBLICATIONS

International Search Report for International Application No. PCT/CN2016/084397 dated Aug. 23, 2016.
(Continued)

*Primary Examiner* — Nam T Huynh

(57) ABSTRACT

A method and system for responding to demand-based charging in a communication network, such as a 5G wireless communication network. Service providers and/or infrastructure providers adjust network usage pricing dynamically based on demand. Customers such as Virtual Network operators respond to pricing adjustments by adjusting their network usage, service requirements, and/or by re-negotiating the pricing structure. Network usage can be adjusted by controlling network traffic generated in response to activity of end-user devices of the Virtual Network.

19 Claims, 8 Drawing Sheets

(51) Int. Cl.
*H04M 15/00* (2006.01)
*H04L 12/927* (2013.01)
*H04L 12/26* (2006.01)

(52) U.S. Cl.
CPC .......... *H04L 47/805* (2013.01); *H04M 15/59* (2013.01); *H04M 15/80* (2013.01); *H04M 15/81* (2013.01); *H04L 41/5003* (2013.01); *H04L 43/0876* (2013.01)

(58) Field of Classification Search
CPC .............. H04L 41/5003; H04L 41/5006; H04L 41/5029; H04L 47/12; H04W 24/02; H04W 4/24
See application file for complete search history.

(56) References Cited

U.S. PATENT DOCUMENTS

| | | |
|---|---|---|
| 2010/0144312 A1 | 6/2010 | Runstedler et al. |
| 2010/0161802 A1 | 6/2010 | Tofighbakhsh et al. |
| 2010/0330957 A1 | 12/2010 | Harada et al. |
| 2011/0276447 A1* | 11/2011 | Paul ................. G06Q 30/02 705/34 |
| 2011/0314145 A1 | 12/2011 | Raleigh et al. |
| 2012/0151009 A1 | 6/2012 | Bouazizi et al. |
| 2012/0233302 A1 | 9/2012 | Kallin et al. |
| 2013/0303114 A1 | 11/2013 | Ahmad et al. |
| 2014/0016464 A1 | 1/2014 | Shirazipour et al. |
| 2014/0086052 A1 | 3/2014 | Cai et al. |
| 2014/0258511 A1 | 9/2014 | Sima et al. |
| 2014/0269295 A1 | 9/2014 | Anumala |
| 2014/0362700 A1 | 12/2014 | Zhang |
| 2015/0230184 A1* | 8/2015 | Raleigh ............... H04L 41/0893 370/230 |
| 2016/0269493 A1* | 9/2016 | Nasielski ............. H04L 67/16 |
| 2016/0337239 A1* | 11/2016 | Nasielski ............. H04L 47/11 |
| 2017/0324536 A1 | 11/2017 | Zarif et al. |

FOREIGN PATENT DOCUMENTS

| | | |
|---|---|---|
| CN | 102318266 A | 1/2012 |
| CN | 102523291 A | 6/2012 |
| CN | 103731887 A | 4/2014 |
| CN | 103959798 A | 7/2014 |
| CN | 104641601 A | 5/2015 |
| EP | 1784027 A1 | 5/2007 |
| EP | 2627034 A1 | 8/2013 |
| GB | 2311439 A | 9/1999 |
| JP | 2011015021 A | 1/2011 |
| JP | 2016521099 A | 7/2016 |
| WO | 2012162646 A1 | 11/2012 |
| WO | 20130159794 A1 | 10/2013 |
| WO | 2014052044 A2 | 4/2014 |
| WO | 2014194188 A1 | 12/2014 |
| WO | 2014197716 A1 | 12/2014 |

OTHER PUBLICATIONS

International Search Report for International Application No. PCT/CN2016/084406 dated Aug. 29, 2016.
International Search Report for International Application No. PCT/CN2016/084410 dated Aug. 23, 2016.
3GPP TR 22.891 titled Study on New Services and Market Technology Enablers, Sep. 2016.
ETSI GS NFV 001 titled "Network Function Virtualization (NFV); Use Cases", Oct. 2013.
ETSI GS NFV 002 titled "Network Function Virtualization (NFV); Architectural Framework", Oct. 2013.
"NGMN 5G White Paper," by the Next Generation Mobile Network Alliance, Feb. 17, 2015.
U.S. Appl. No. 15/169,091, filed May 31, 2016. Not yet published.
U.S. Appl. No. 15/169,376, filed May 31, 2016. Not yet published.
Extended European Search Report dated Apr. 12, 2018 for corresponding European Application No. 16802557.5 filed Jun. 1, 2016.
Shrivastava et al. "An SDN-Based Framework for Elastic Resource Sharing in Integrated FDD/TDD LTE-A HetNets", Oct. 8, 2014.
Extended European Search Report dated Apr. 17, 2018 for corresponding European Application No. 16802566.6 filed Jun. 1, 2016.
Extended European Search Report dated Apr. 26, 2018 for corresponding European Application No. 16802563.3 filed Jun. 1, 2016.

* cited by examiner

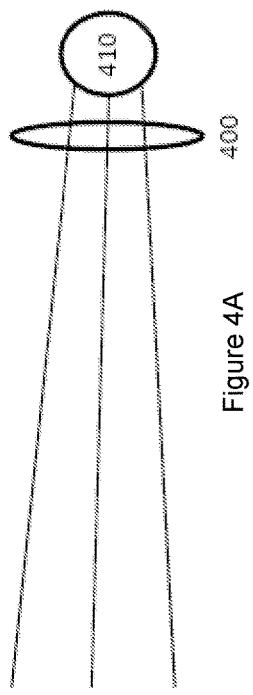
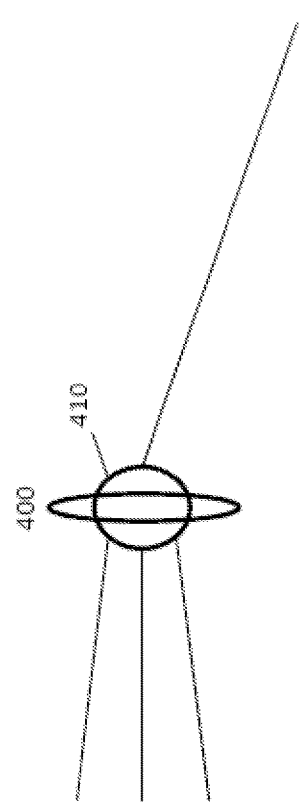

METHOD AND APPARATUS FOR DYNAMICALLY CONTROLLING CUSTOMER TRAFFIC IN A NETWORK UNDER DEMAND-BASED CHARGING

CROSS-REFERENCE TO RELATED APPLICATIONS

This application claims priority from U.S. Provisional Patent Application No. 62/169,084 filed on Jun. 1, 2015, and to U.S. Provisional Patent Application No. 62/222,340 filed on Sep. 23, 2015, both of which are herein incorporated by reference.

FIELD OF THE INVENTION

The present invention pertains to the field of communication networks and in particular to a method and apparatus for dynamically controlling customer traffic in a network when demand-based charging is being used by the network.

BACKGROUND

In current mobile networks, such as those based on Long-Term Evolution (LTE) standards specified by the Third Generation Partnership Project (3GPP), numerous functions, such as charging and Quality of Service (QoS) guarantees, are provided by network functions in the core network, also referred to as the Evolved Packet Core (EPC). In so-called 3G networks, these functions were provided by entities in the Packet Core (PC). As it pertains to fee charging, different entities are responsible for collecting charging information depending on whether the user is on a home or visiting network.

Current network architectures allow for a limited number of charging scenarios, as well as a limited number of QoS levels. Accounting and charging for data traffic is typically on a per-bit basis, and there is limited support for differential charging based on different QoS levels. However, as technologies and wireless network capabilities evolve, different services and service levels become available, and conventional service offerings, conventional approaches to Customer Service Management (CSM), and conventional approaches to charging for such service offerings, become insufficient.

Virtual networks are capable of serving the needs of user groups or organizations. The virtual network can be implemented using a subset of resources of a larger network infrastructure. In addition, Network Function Virtualization (NFV) allows for various network services to be virtualized so that they can be performed by generic, rather than dedicated hardware components. NFV can be used to instantiate and manage customer functions at various network nodes.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and system for facilitating demand-based charging in a communication network. In accordance with an embodiment of the present invention, there is provided a method for imposing dynamic charging in a network, the method comprising: instantiating a function in the network to manage dynamic charging; and in response to information indicative of network traffic loads, dynamically adjusting network usage-based charging for a plurality of network slices of the network according to respective Service Level Agreements of the network slices.

In accordance with another embodiment of the present invention, there is provided a method for responding to dynamic charging in a communication network, the communication network comprising network resources belonging to one or more resource providers, the method comprising: dynamically adjusting network resource usage in response to an indication of a charging change by a resource provider.

In accordance with another embodiment of the present invention, there is provided a method for responding to dynamic charging in a communication network, the communication network comprising network resources belonging to one or more resource providers, the method comprising: re-negotiating a contract between a customer representing the communication network and at least one of the resource providers in response to an indication of a charging change by said one or more resource providers.

In accordance with another embodiment of the present invention, there is provided a communication network comprising: a function in the network configured to manage dynamic charging; the function further configured, in response to information indicative of network traffic loads, to dynamically adjust network usage-based charging for a plurality of network slices of the network according to respective Service Level Agreements of the network slices.

In accordance with another embodiment of the present invention, there is provided a Dynamic Charging Handler (DCH) function element in a communication network, the communication network comprising network resources belonging to one or more resource providers, the DCH function element configured to: dynamically adjust network resource usage in response to an indication of a charging change by a resource provider.

In accordance with another embodiment of the present invention, there is provided a Dynamic Charging Handler (DCH) function element in a communication network, the communication network comprising network resources belonging to one or more resource providers, the DCH function element configured to: re-negotiate a contract between a customer representing the communication network and at least one of the resource providers in response to an indication of a charging change by said one or more resource providers.

In accordance with embodiments of the present invention, there is provided a method for providing Customer Service Management (CSM) in a communication network, the communication network providing at least one service involving one or more terminals serviced by the communication network, the method comprising defining a CSM function element based upon said at least one service and customized to said at least one service.

In accordance with embodiments of the present invention, there is provided a Customer Service Management (CSM) function element in a communication network, the communication network providing at least one service involving one or more terminals serviced by the communication network, the CSM function element based upon said at least one service and customized to said at least one service.

BRIEF DESCRIPTION OF THE FIGURES

Further features and advantages of the present invention will become apparent from the following detailed description, taken in combination with the appended drawings, in which:

FIG. 4A illustrates placement of billing functions relative to network nodes in accordance with an embodiment of the present invention.

FIG. 4B illustrates placement of billing functions relative to network nodes in accordance with another embodiment of the present invention.

It will be noted that throughout the appended drawings, like features are identified by like reference numerals.

DETAILED DESCRIPTION

Figure 1:
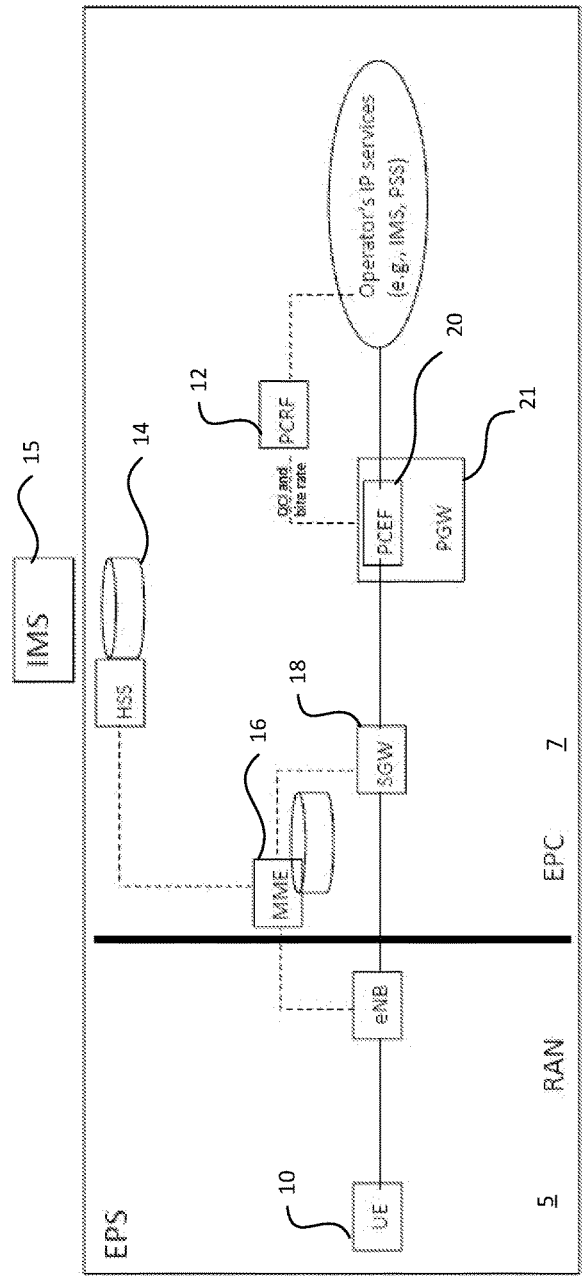
FIG. 1 illustrates a conventional architecture used in 3G and 4G wireless communication networks in relation to service management.

Various acronyms as used herein are defined in the following non-exhaustive list:
AAA: Authentication, Authorization and Accounting
CSM: Customer Service Management
DAM: Data Analytics Management Entity
eNB: E-UTRAN NodeB
EPC: Evolved Packet Core
FPM: Financial Policy Manager
G-CSM: Global Customer Service Management
HSS: Home Subscriber Server
IMS: IP Multimedia Subsystem
KPI: Key Performance Indicator
M2M SP: Machine-to-Machine Service Provider
MANO: Management and Orchestration
MME: Mobility Management Entity
MTC: Machine Type Communication
NFV: Network Function Virtualization
NPM: Network Performance Monitor
NS: Network Service
PCRF: Policy and Charging Rules Function
PCEF: Policy and Charging Enforcement Function
PGW: Packet Gateway
QoE: Quality of Experience
QoS: Quality of Service
RAN: Radio Access Network
SDRA: Software Defined Resource Allocation
SDT: Software Defined Topology
SGW: Serving Gateway
SLA: Service Level Agreement
SN: Service Negotiator
TCSP: Telecommunications Service Provider
UE: User Equipment
VN: Virtual Network
VNF: Virtual Network Function
VNFFG: Virtual Network Function Forwarding Graph
v-s-CM: virtual service-specific Connection Management
v-u-CM: virtual user-specific Connection Management
v-s-SGW: virtual service-specific Serving Gateway
v-s/u-SGW: virtual service-specific or user-specific Serving Gateway
v-u-SGW: virtual user-specific Serving Gateway As used herein, a "network" or "communication network" may service various devices including but not necessarily limited to wireless devices. Such a network may include a radio access portion and a backhaul portion. The network may further comprise various virtualized components as will become readily apparent herein. A primary forward looking example of such a network is a 5G network which is proposed to be reconfigurable and capable of network slicing, as described below. The network may include a number of computing hardware resources that provide processors, memory, and storage to functions executing on the network.

Network slicing refers to a technique for separating different types of network traffic which can be used in reconfigurable network architectures, such as networks employing Network Function Virtualization (NFV). A network slice (as defined in 3GPP TR 22.891 entitled "Study on New Services and Markets Technology Enablers") is a collection of logical network functions that supports the communication service requirements of a particular network service. One use of network slicing is in the core network. Through the use of network slicing, different service providers can have distinct core networks that run on the same physical set of network and computing resources. This can also be used to create a virtual network dedicated to particular types of network traffic. It should be understood that this discussion is not intended to exclude the application of network slicing as it applies to the radio access edge of the Radio Access Network (RAN), which may need specific functionality to support multiple network slices or partitioning of resources for different network slices. In order to provide performance guarantees, the network slices can be isolated from each other so that one slice does not negatively affect the other slices. The isolation is not restricted to different types of services, but also allows the operator to deploy multiple instances of the same network partition.

In contrast with having all wireless devices connect with the network through a Mobility Management Entity (MME) determined by a network infrastructure component (e.g. base station, access point, eNB), network slicing allows the instantiation of separate network slices respectively directed toward different network services.

In an aspect, the present invention relates to use of a new function element operative on a slice level to allow for separation of different types of traffic, the different types of traffic potentially having different packet processing requirements and QoS requirements, and to provide different network service level for that slice.

Network slicing may correspond to the allocation of pooled resources to offer different services to different customers or groups of customers, such that different services are supported by different customized virtual networks, where the different customized virtual networks are substantially separate from one another from the customer's point of view. The pooled resources may be commercial-off-the-shelf hardware components capable of configuration through virtualization approaches, such as NFV, in order to support various network functionalities for supporting the operations of the network slices.

The Network Function Virtualization (NFV) framework can be used to define a plurality of virtual network functions (VNFs), each of which can correspond to a function enabling operation of a communication network. For example, a VNF can provide the functions of a router, switch, gateway, firewall, load balancer, server and the like, when executed on at least one computing hardware resource available on the network. The function is virtualized in the sense that it may utilize a set of virtual resources, such as computing, storage and networking resources, when executed on one or more hardware resources rather than utilizing specific dedicated hardware resources. In some instances, the function may be executed on processors across a plurality of hardware resources, to provide distributed functionality across the network.

As such, VNFs may be instantiated on an as-needed basis using available virtual resources supplied by hardware resources available on the network. NFV and virtual network functions architecture is described, for instance, in ETSI GS NFV 001 entitled "Network Function Virtualization (NFV); Use Cases", October 2013 and ETSI GS NFV 002 entitled "Network Function Virtualization (NFV); Architectural Framework", October 2013, for example.

In heterogeneous networks, in addition to a plurality of different types of nodes covering different locations, different infrastructure providers may own different parts of what is considered as an access network (or even parts of a core network). For instance, a Telecommunications Service Provider (TCSP), who provides service to a final customer, such as an M2M Service Provider (M2M SP) or another virtual service provider, may wish to provide a simple network to the final customer. As such, the TCSP will create a virtual network (VN) having virtual nodes and virtual links between the nodes on the existing network.

The M2M SP can access a service available on the network by interacting with the VN. However, the VN (both nodes and links) need to be mapped to physical infrastructure. In some instance, the VN may use a subset of the available physical nodes, rather than all of the available physical nodes on the network. Furthermore, the VN may only employ a portion of the available resources at each physical node of the subset of the available physical nodes used by the VN. It should also be understood that the M2M SP may make use of more than one TCSP, allowing it to create a slice extending across a plurality of different networks, effectively having a network slice that is a superset of the resources of one or more TCSPs.

If certain bandwidth requirements are set for each logical link, then a percentage of an available physical link may be allocated to create the virtual link. This may also include aggregating links to create a logical link of greater capacity than a single physical link.

Network slices are the collection of the allocation of the resources in what may be different networks. A network slice, from the perspective of an infrastructure provider may only include resources in the infrastructure provider network. From the perspective of the M2M SP, the network slice is a substantially seamless aggregation of all network slices that the M2M SP uses which is analogous to the VN. The TCSP deals with seamlessly connecting the different network slices of infrastructure provider resources, along with network slices from the TCSP resources, to create the M2M VN. It should be understood that at various points in time, the total allocation of network slices for different resources may not add up to 100%. If the value is less than 100% it means that the resource is not fully utilized. If it exceeds 100% it may be a network design choice knowing that there is a very low likelihood that all customers will be using a resource at the same time. It should be understood that the size and nature of different network slices can vary with time as new resources come online or as existing resources are re-allocated. The M2M SP may typically be unaware of the changes in the infrastructure."

In some embodiments, network slicing relates to the ability of a network, such as a 5G communication network accessible by wireless devices, to provide multiple logical network slices on demand, with each network slice operating as a substantially separate network viewed as a service. The capabilities and operating parameters of each network slice may be customized to the service requirements for that network slice. Configuration of the network slices may be based on software defined networking, network function virtualization and network orchestration.

In some embodiments, network slicing relates to the ability of a network, such as a 5G communication network accessible by wireless devices, to provide multiple logical network slices on demand, with each network slice operating as a substantially separate network viewed as a service. The capabilities and operating parameters of each network slice may be customized to the service requirements for that network slice. Configuration of the network slices may be based on software defined networking, network function virtualization and network orchestration.

According to embodiments of the present invention, the communication network architecture is based on a Network Function Virtualization (NFV) framework. The NFV Management and Orchestration (MANO) entity is used to instantiate the necessary network functional components to provide the service identified by a Network Service (NS) request. The instantiation of a network service request is described by a Virtual Network Function Forwarding Graph (VNFFG) which defines the set of network functions that are required to provide the requested service. The VNFFG contains a Network Forwarding Path (NFP) that defines a sequence of actions that are to be performed, for example, by a collection of VNFs, to provide the requested service.

An NFV-MANO entity includes an Orchestrator function, a Virtual Network Function Manager (VNFM) function and a Virtual Infrastructure Manager (VIM) function. According to embodiments, the functionality of the Orchestrator function, VNFM function and VIM function can be as defined in standards ETSI GS NFV 001 and ETSI GS NFV 002, for example (see, for instance www.etsi.org).

According to embodiments, the VIM function is configured to manage the Network Function Virtual Infrastructure (NFVI) which can include physical infrastructure, virtual resources and software resources in a NFV environment. For example, physical infrastructure can include servers including processors, storage devices, and the like and virtual resources can include virtual machines. According to embodiments, there can be plural VIM functions within a particular NFV architecture, wherein each VIM function is responsible for the management of its respective NFVI. In application the VIM functions may be executed on processor(s) of one or more of the physical hardware devices distributed across the network.

According to embodiments, the VNFM function can be configured to manage the Virtual Network Functions (VNF) and can manage the lifecycle of the VNFs. For example, the VNFM function can create, maintain and terminate VNF instances, which can be installed on virtual machines that are created and managed by the VIM function. The VNFM function can also be configured to provide fault, configuration, accounting, performance and security management (FCAPs) of the VNFs. In addition, the VNFM function can be configured to scale-up and scale-down one or more of the VNFs which can result in the scaling-up and scaling-down of the usage of the central processor(s) that is providing the computational power for the realization of the VNFs. In some embodiments, each VNFM function manages a separate VNF or a single VNFM function manages multiple VNFs.

According to embodiments the Orchestrator function can be configured to coordinate, authorize, release and engage the NFVI resources by interaction with the VIM function. The Orchestrator function further is configured to create end-to-end service between different VNFs by interaction with the VNFM function.

According to embodiments, the G-CSM function can be functionally integrated within the Operational Support System/Business Support System (OSS-BSS). The OSS can include functions that support back-office activities which aid in operating a communication network, as well as provision and maintain customer services and the like. The BSS can include functions that support customer-facing activities, for example, billing order management, customer relationship management, call centre automation and the like. In this embodiment, the G-CSM function can communicate with the Orchestrator function using the Os-Ma-nfvo interface, which provides communication between the OSS/BSS and the Orchestrator function.

According to some embodiments, the G-CSM function can be instantiated within the network but external to the OSS/BSS. In this configuration, another interface, which is not defined with the NFV framework, is configured in order to provide communication between the G-CSM function and the Orchestrator function.

Embodiments of the present invention provide for a method for providing Customer Service Management (CSM) in a communication network, such as a next generation wireless network (such as a so called fifth generation (5G) wireless communication network). It will be understood that the teachings of the following disclosure may also be applicable to existing network architectures. The communication network provides at least one service involving one or more terminals serviced by the communication network.

Embodiments of the present invention provide for a Customer Service Management (CSM) function element in a communication network. The communication network provides at least one service involving one or more terminals serviced by the communication network.

In some embodiments, the at least one service involves a plurality of terminals and/or at least one of the one or more terminals supports a plurality of services. In some embodiments, the CSM function element provides charging/billing data for said at least one service. Rules for providing said charging/billing data may be customized to said at least one service. The location of elements that log traffic for the purposes of charging can be made based on the topology of the logical network that provides the service being charged for. For instance, different function elements supporting different services in the same network may make use of different node locations to log traffic (e.g. a QoS function element may be located throughout the VN, whereas charging function elements may be located at end points of the VN.

The CSM functional entities can provide a series of different functions to the services that they support including any of the following functions alone or in isolation: context management, QoS management, QoE management, and services related to modification of a virtual topology for the VN. Charging log elements may be placed based on network-topological aspects of the at least one service. For example, the charging log elements may be located at a RAN servicing a UE accessing the network, and may move to subsequent RAN's to follow the mobility of the UE as it accesses those subsequent RAN's to maintain access to the service while in transit. In some embodiments, the CSM function element provides context management customized to the at least one service. In some embodiments, the CSM function element provides QoA management, QoE management, or a combination thereof, customized for the at least one service. In some embodiments, a virtual topology of the communication network is adjustable through virtualization, the method further comprising customizing the virtual topology of the communication network for the at least one service.

In current 3G/4G networks, customer service management operations, such as session QoE/QoS control, billing/charging schemes, context management, and the like, are designed for individual users based upon a pre-determined subscription tied to each hardware device. Furthermore, existing networks typically use Static Policy and Charging Rules Functions (PCRF) and support only limited QoS classes. Commonly, the PCRF's are applied to all connections made to the network, with QoS aided through techniques such as traffic shaping which filters by traffic type (e.g. downloaded video data), rather than by service.

In future networks, such as the core network for 5G networks, various new types of services may be provided and more extensive and deeper collaboration among multiple operators may be necessary. It is recognized herein that customer service management for such networks requires design approaches that facilitate these requirements.

In various embodiments of the present invention, customer service management may be customizable for different types of services. In an aspect, a Customer Service Management (CSM) function is operative to provide customer service management on a service level, rather than as a broad device-based application is currently in effect. CSM can allow for customized service negotiation and admission, and may allow for service-customized QoE control. For instance, the CSM may be operative to adjust one or more network parameters during a session to either improve the QoE provided to the service, or to reduce network utilization to conserve resources while still maintaining a minimum QoE level.

Further, QoE may be measured for a "service" involving more than one device, and based on statistics of quality of traffic flowing among the service's devices, service functions and servers within the service VN. The CSM as described herein may further provide for service customized charging and/or billing. The CSM may provide for particular service based charging rules and placement of charging log elements. The CSM may provide for service based service context management, for example, in which different contexts can be defined for different services. The CSM may further be configured in view of a confederation of networks. The CSM may control the collaboration among operators regarding the QoE/QoS, charging, and context update and sharing Service based AAA.

Embodiments of the present invention may enable 5G support service customized CSM which is best suitable to the service characteristics.

3G/4G Service Management

FIG. 1 illustrates a conventional architecture used in 3G and 4G wireless communication networks as it pertains to service management. This architecture is characterized in part by QoS, charging and context being set for an individual UE 10. The architecture includes: a static Policy and Charging Rule Function (PCRF) 12, limited QoS classes, open loop QoS management, and limited (if any) collaboration among operators or different networks. For example, in open loop QoS management, traffic is handled at the bulk level with no evaluation of whether the applied QoS management is resulting in the customer experience meeting the expected QoS level. This makes it difficult to control QoS to the satisfaction of customers, who may not be experiencing a promised QoS level, though the network could provide acceptable service with appropriate QoS management. Furthermore, open loop QoS management may lead to unnecessarily tying up network resources that could be employed elsewhere while still meeting the expected QoS level.

In more detail in relation to FIG. 1, the Evolved Packet System (EPS), particularly on the Radio Access Network (RAN) side 5, may perform bearer management, including session management corresponding to the establishment, maintenance and release of bearers. The EPS may further perform connection management, including mobility management corresponding to establishment and security between the network and the UE 10. The EPS may further perform authentication, such as mutual authentication and handling of security keys.

Further in relation to FIG. 1, the IP Multimedia Subsystem (IMS) 15 may use the Evolved Packet Core (EPC) 7 to support emulated circuit service, such as VoIP, Video, VoLTE and the like. The Home Subscriber Server (HSS) 14 holds subscriber data, such as QoS profiles, access restrictions for roaming, allowed connected PDNs as specified by access point name, and dynamic subscriber data such as Current MME. This data stored in the HSS may typically be static, or slowly changing in response to back-end changes such as customer subscription changes. The HSS may integrate with an Authentication Center (AUC) (not shown in FIG. 1) to create vectors for authentication and security keys. The Mobility Management Entity (MME) 16 is configured, for each powered-on UE 10, to create a context, including static information, such as subscriber information from the HSS and UE capability, and dynamic information, such as a bearer list.

The Serving Gateway (SGW) 18 is configured to maintain a charging log for visiting UEs, and may also perform QoS enforcement. The PCRF 12 is configured to make policy control decisions, such as QoS authorization, Quality Control Index setting, and bit rate decisions. The PCRF 12 may devise QoS rules based on information stored by the HSS 14. The Policy and Charging Enforcement Function (PCEF) 20 is configured to enforce QoS based upon the static PCRF 12, may perform flow-based charging, and IP packet filtering into QoS bearers.

In the above illustrated 3G/4G architecture, all data routed to a UE 10 in its home network passes through the Packet Gateway (PGW) 21. This makes the PGW 21 a logical location to embed traffic logging for the purposes of billing. However, when the UE 10 is roaming outside of its home network, its traffic no longer gets routed through the PGW 21. Instead, the UE's traffic is sent through any number of different roaming SGWs in the roaming network. This makes aggregating the roaming data charges more difficult as the roaming SGWs do not provide feedback to the SGW 18. Monitoring UE traffic requires that all potential SGWs, whether on the home network or a roaming network, through which data may have been routed record and report the chargeable traffic. Accordingly, charging may be performed at the SGW 18 or the PGW 21 depending upon the case. The MME 16 and the HSS 14 handle UE context and information such as dynamic bearers.

Further, the above 3G/4G network architecture has been designed on the assumption that there are only a small number of network operators, and most of the traffic is intra-network traffic with little shared network resources between network operators. In this model an operator typically has a direct relationship with consumers, owns the network infrastructure and provides services to its customers over a set of frequencies that it has exclusive use of. Operators typically form trusted relationships with one or more other selected operators to allow their customers to obtain service in other countries or in regions in which they do not offer service. The ability of a UE to roam on a network is a function of the availability of a trusted relationship between the operators of the visited network and the home network. This allows operators to decide how complex a web of trust relationships should be created. The trust relationships are pair-wise relationships. In order to participate in these arrangements, however, a network operator needs to provide a rather robust infrastructure to allow for billing, authentication, and the like. Smaller providers that only want to provide infrastructure for other network operators, and other such business variations are not properly supported in the context of a 3G/4G architecture.

In 3G/4G networks, there are a small number of different QoS levels that are defined, and because the QoS levels are stored in the HSS 14, and related policies are set by the PCRF 12, they are statically defined. A UE 10 accessing a given service has a defined QoS level assigned to that UE 10 based upon a UE profile stored in the HSS 14 previously assigned to, and associated with, the UE 10. In order to change the QoS level, a user must request a change to their subscription for that UE 10. Furthermore, in 3G/4G networks, control of the QoS level relates solely to the amount of bandwidth that may be allocated in the network. In order to meet the defined QoS level, the network operator can only make gross adjustments to the network in an effort to increase the network throughput, such as by using traffic shaping. Different network loading conditions are not typically considered in the QoS guarantee on a session-by-session basis. Furthermore, a service can associate with multiple UEs 10 which may each require the same QoS/QoE and a network Key Performance Indicator (KPI), based upon their subscriptions and corresponding UE profiles stored in the HSS 14.

Customer Service Management (CSM)

In view of the above limitations, embodiments of the present invention provide for an approach to CSM, which allows for a degree of customization of interactions to enable different types of service offerings. Further, in embodiments of the present invention, CSM is service-based rather than device-based. Embodiments of the present invention may relate to one or more of: bearer management, connection management, authentication, charging, or other functions.

In 3G/4G scenarios, billing is associated with the hardware, i.e. the UE, that generates the traffic, and is typically set as a function of the data consumed and/or uploaded by the UE. This manner of billing is suited to a scenario in which the UE is a mobile device such as a smartphone, is tied with a a single subscribing user, and has a limited range of services and service levels to be accessed. When devices are used or accessed by a plurality of different service providers, in a 3G/4G network, there is no current mechanism to allow for different policies that accommodate differential billing and differentiated service levels.

In an environment rich with Machine Type Communication (MTC) devices, also referred to as machine-to-machine (M2M) devices, such a billing structure may not be appropriate. It may be advantageous to bill the M2M service for the data exchanged with the service, rather than by the UE that originates or transmits that data. For instance, it may be preferable to bill the M2M service in the case where an MTC device generating (exchangint) data traffic with the network is not uniquely associated with a single responsible entity.

In one example, different meters (e.g. electrical meter, gas meters, and water meters) may all make use of a single hub or M2M gateway. The hub communicates with different services, and different service providers may each be responsible for part of the data consumption. As such, billing for traffic generated by the hub/gateway is not directed to the owner of the device, but instead each M2M service provider is billed for their respective traffic. In another scenario, a wide deployment of MTC devices may result in a network provider allocating resources to the devices, even when no traffic is generated. Similarly, a M2M network of devices may rely upon one or more networks for connectivity, but may regularly communicate at a limited service level, for instance off-hours or from specific locations, to provide updates. In these scenarios, it would be desirable for the owner of the M2M network to be the subscriber, and to be billed in aggregate, rather than having a separate subscription for each M2M device of the network. Furthermore, a customized data service and associated charging package would be preferred for such devices which don't transmit priority traffic, such as voice of video communications. In 3G/4G the billing is typically based on the data exchanged, and does not provide a mechanism to financially value a mix of the data type, limited service level, and to bill for the standby resources allocated to the devices when they are not active.

In another scenario a user, such as an enterprise or individual, may utilize multiple wireless-enabled devices to provide, or consume, a service. At least some of the devices may be owned by the user and/or at least some of the devices may be owned by another entity such as a private or public entity, or even by a network owner or operator. The devices are capable of accessing the network and performing their own functions, such as processing, sensing or actuation functions. When the user accesses, or dispenses, a service involving these devices, context management, billing, QoE, and the like, are associated with the service rather than the individual device owners, of which there may be several. Furthermore, a particular UE may employ a different subscription, QoE, and QoS for different services accessed from that UE. Accordingly, the decoupling of the QoE, QoS, and billing from the device, and allocating it to the service, provides a UE with the option of having a plurality of different QoE, QoS, and billing arrangements, each corresponding to a different service accessed by that UE.

Embodiments of the present invention provide for customized service negotiation, admission, and/or QoE control. For example, QoE may be measured for a service involving more than one UE, and based on statistics of the quality of traffic flowing among the service's devices, service functions, and servers, such as within the service VN. QoE feedback may be provided in substantially real time and potentially used to adjust resource allocations in support of a service at a promised QoE level.

Embodiments of the present invention provide for service-customized charging/billing. For example, charging rules and placement of charging log elements may be configured based on a particular service being provided.

Embodiments of the present invention provide for service-based service context management. For example, different contexts may be defined for different services, and the different contexts may be managed on a service-by-service basis.

Embodiments of the present invention provide for a confederation of networks. Some embodiments allow for a seamless service path across different networks. For example, a third party CSM may control the collaboration among network operators regarding the QoE/QoS, charging, and context update and sharing for a service that spans a plurality of networks, each operated by a different network operator.

Embodiments of the present invention provide for service-based Authentication, Authorization, and Accounting (AAA). As such, instead of or in addition to performing AAA on User Equipment (UE), AAA may be performed on a service.

In embodiments of the present invention, a service corresponds to the usage of network resources and terminal resources in furtherance of a desired result. The service may be associated with an application, such as a data collection or terminal configuration application, a user application or usage of the network for communication, or the like, and in some aspects a standby utility to provide at least one of the services. Different devices can access a service with a QoS that may be specified on a per service, UE, and/or UE subscription basis.

Service requirements may involve functions, service types and distribution of traffic. A service can also include:
 a group of flows having a common start or end point;
 a group of data flows where the data shares a common format to enable distributed processing; and,
 a group of data flows that share sufficient common features that, from a network planning perspective, it makes sense to group them together for traffic management.

To address many of these issues, embodiments of the present invention make use of virtualized environments, including virtualized network topologies that are created specifically to enable customized billing and QoS policies. In reference to FIG. 2, a CSM-service makes use of the requirements of a customer to interact with a controller 210 (or set of controllers 210) that can provide Software Defined Network control functions, Software Defined Protocol Functions, Software Defined Resource Allocation functions, Software Defined Topology functions, flow management and traffic engineering. Using the physical infrastructure 215 available (which may include infrastructure from third party providers (of both infrastructure and services)) a virtual network can be created so that all relevant nodes and logical pathways in the virtual network are aware of the QoE requirements of a customer for service A. This virtual network may alternately be described as a network slice. The network slice may be limited to a single service A accessed by the customer's UE, may include more than one of the services accessed by the customer's UE, may include common services accessed by different UE's, may include one or more services accessed by a plurality of UE's assigned to the customer, or other combinations defined by pre-defined criteria (device identity, customer identity, service identity, QoS level, QoE level, etc.)

Instead of relying upon rules created by a Policy and Charging Rules Function (PCRF) and enforced by a Policy and Charging Enforcement Function (PCEF), QoS and QoE are fundamental parts of the defined virtual network architecture. Virtual nodes and logical links are instantiated based upon the pre-defined criteria set by the controller 210 to accommodate the requirements of a service at the outset. This allows the flexibility to effectively provide a virtual network that may be customizable by customer, UE, service, and/or a combination of these factors. Accordingly, a plurality of different virtual networks may be created for each of these criteria, allowing for similar data types to be treated differently, different services from a common UE to be treated differently, and each customer to be provided with a customized QoS, QoE, and billing environment.

In some embodiments, the user plane represents a logical construct for the data flows and control functions associated with a user, organized into customized topology or architecture, which can include virtual functions and physical elements. For example, the topology may be a tree topology, a mesh topology, a mixed topology, or the like. The topology may be customized at least in part to provide a requested service.

In some embodiments, devices may have a variety of capabilities, such as communication capabilities, data processing capabilities, and the like. Devices may be used to concurrently or sequentially support a variety of services, and may be M2M devices or user devices, for example.

CSM QoE Considerations

In current 3G and 4G wireless communication networks, as illustrated by FIG. 1, QoS management is focused on the UE 10 as defined through the user profile assigned to each UE in the HSS 14. As defined in 3GPP documents, each UE 10 is uniquely associated with a subscriber (typically through the Subscriber Identity Module (SIM)). Accordingly, QoS and billing are traditionally considered on a per-UE basis, and are tied to a specific UE 10. QoS enforcement is located at PGW 21 for home UEs 10 and in SGW 18 for visiting UEs. The placement of the QoS enforcement functions was made due to factors that include a network architecture/topology that does not isolate different users on the same network. This results in an architecture that provides a limited number of QoS levels. Available QoS levels typically correspond to predetermined levels of a QoS Class Index (QCI).

Embodiments of the present invention can provide a Quality of Experience (QoE) level in addition to, or in place of, a QoS level. Different QoS parameters on different links of an end-to-end path may result in the same QoE. For instance, the end of a data path is closest to the UE, and may tolerate a lower QoS than a beginning of the data path. Similarly, in congested areas of a network a higher priority may be required to avoid latency.

QoE provides a network operator with more flexibility in how to allocate resources. End-to-end QoE control can be achieved using the method outlined below. In some aspects, QoE control may be service-based, with QoE enforcement performed by a controller 210 which configures end-to-end virtual resources to satisfy the required QoS parameters along the entire link so that the overall link will have the required QoE. The controller 210 is configured to facilitate network resource allocation and deployment for example, in accordance with functionalities such as software-defined networking, network function virtualization, software defined topology, and the like. The controller may be configured to direct a software-defined and software-controlled networking architecture, capable of Network Function Virtualization, for example, by adjusting the software-controlled network to develop a VN based on input from the CSM 220, in view of the current existing infrastructure. Those skilled in the art will appreciate that a software-defined networking controller can be used to manage and create a service-centric access network that has the services and features integrated in various nodes. In prior art networks, specific nodes are dedicated to creating or enforcing policy and ensuring QoS guarantees for all traffic and users. In contrast, the service-specific network performs enforcement of policies at some or all of the nodes which provide the service. The allocation of policy enforcement among nodes may be designed specifically to ensure that the objectives of the network are met in providing that service.

Further, multiple network nodes may be involved in QoS/QoE enforcement for one service due to the distribution of devices associated with a single service. As such, QoS/QoE enforcement is not necessarily limited to a single PGW 21 or SGW 18. Accordingly, in an aspect a plurality of enforcement nodes may be implemented. Thus, a wider variety of requirements may be addressed, at potentially higher granularity than existing approaches.

Further, embodiments of the present invention provide for and/or operate on the basis of a closed-loop QoE principle, which can allow customer independent QoE monitoring of the quality of the delivered services. For instance, enforcement of QoS policies across a slice may be matched to the QoE experienced by one or more customers. Accordingly, where the measured QoE drops below a threshold level the QoS policies may be changed at one or more nodes serving the slice until the measured QoE increases above the threshold level. In some aspects, the threshold level may be high enough that the user's QoE does not appreciably drop below an acceptable level before the QoS policies are adjusted.

Further, customers may be enabled to issue a complaint to the CSM 220, or to re-negotiate service requirements and pricing. In contrast to currently deployed network architectures, where the only mechanism for a customer to evaluate the provided QoS is to ask for network reports, the disclosed methods allow for QoS and QoE evaluations to be performed on a service and provided to the network controllers 210 as feedback. Because QoE relies upon user evaluation of the sufficiency of the service, there are no automated mechanisms in the prior art to address these concerns. By having a series of virtual network components that can be adjusted in response to dynamic feedback, node and link performance can be adjusted to provide the needed QoE, and to ensure that resources are not being unnecessarily deployed. The adjustment of virtual elements can include scaling out, scaling in, scaling up and scaling down (creating new virtual elements, removing virtual elements, increasing the resources allocated to an element, and reducing the resources allocated to an element respectively). If the overall network cannot provide the desired QoE for any of the virtual networks, due to the resource usage by other virtual networks, adjustments can be made to any or all of the networks that are not using their allocated resources so that all customers receive a level of service that best approximates their needs.

In some embodiments, the VN architecture supporting a service is developed based on requirements such as QoE/QoS requirements for that service. As such, explicit policy enforcement may not be required, but rather the VN is created in such a way that the QoE/QoS requirements are achievable and potentially guaranteed. Creation of such a VN may involve allocating appropriate amounts of infrastructure resources at appropriate locations in order to provide a desired QoE/QoS level.

Embodiments of the present invention related to CSM and QoE management comprise establishment of a service oriented VN with QoS guarantees.

Figure 2:
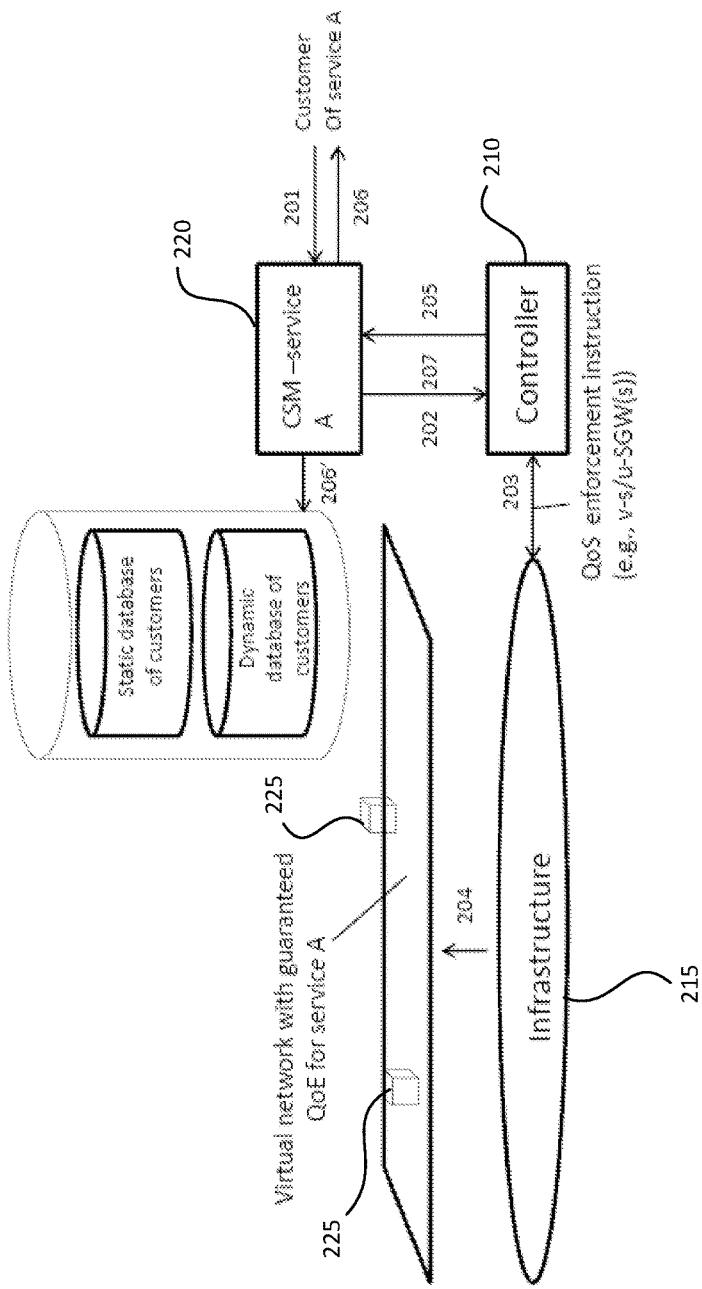
FIG. 2 illustrates a process for Service Virtual Network establishment in accordance with embodiments of the present invention.

FIG. 2 illustrates a process for service oriented VN establishment in accordance with embodiments of the present invention. The process involves the following operations, with reference numerals as denoted in FIG. 2.

In a service selection operation 201, a customer interacts with a CSM 220, for example, via a defined API accessed by a UE. The service selection operation 201 may include, for instance selection of a service level for one or more services that a customer would like to access. The service selection operation 201 may further define one or more devices, UE's 225, that will access the one or more services. The service selection operation 201 may associate at least one of a customer identity, a device identity, and a service level with that service. The information provided in the service selection operation 201 allows the CSM 220 to develop a series of parameters for VN establishment and charging rules to be established for each of those one or more services, and optionally the customer(s) and device(s).

In VN setup operation 202, CSM 220 interfaces with the controller 210 for a virtual network setup based upon the service selection operation 201. This may correspond to VN admission control. The VN setup instructions allow the controller 210 to map the requirements from the CSM 220 to the available infrastructure 215. This forms the foundation of the virtual nodes and virtual links that allow for the creation of the service-specific VN.

In assignment operation 203, data forwarding and access resource assignment information are used to instantiate the virtual network nodes/virtual functions using the network infrastructure. The assignment operation 203 may occur upon receipt of a service request from a UE, or may occur in advance of the service request for distribution about the network. The assignment operation 203 typically includes QoS/QoE enforcement policies as defined from the service selection operation 201.

In VN operation 204, in response to a service request submitted to the network, a service-specific VN is established using the virtual nodes, functions and links defined by the assignment operation 203. The service-specific VN is established including QoS and QoE policies to be distributed to, and enforced at, one or more of the virtual nodes. The enforcement may include, for instance, evaluating QoE on the VN to meet rate assurances, and/or evaluating bandwidth to enforce rate caps.

In VN report operation 205, the controller 210 informs the CSM 220 of the VN establishment.

In service report operation 206, the CSM 220 informs the customer that the VN has been established, and in update operation 206' the CSM 220 updates the customer database with the service request. As such, QoE and charging rules may be allocated on a per-service basis.

In charging operation 207, CSM 220 employs the controller 210 to configure CMS-charging element(s) and QoS delivery monitoring elements in selected network nodes. In some embodiments, CMS-charging elements and QoS delivery monitoring elements and/or charging elements may be co-located with the virtual service-specific/user-specific serving gateways (v-s/u-SGWs). Various data may also be logged, such as delay data, cloud resources usage data, bandwidth usage data, and the like, and associated with the service. Further, pre-defined parameters for triggering update and service VNs may be provided and/or used. It should be noted that these operations can be repeated when the CSM 220 is informed of a necessary service level change by the customer.

In addition to the above operations, customer charging may subsequently be performed. This may include comparing logged QoS parameters with promised QoS parameters, along with actual service usage/availability, and issuing a bill, credit, or the like in accordance with billing arrangements, whether they are based on transactional billing, billing for a general level of service, billing for availability of a service or other such arrangements. In some embodiments, the collected logged QoS and promised QoS for all services within a charging period may be aggregated and compared, and a bill, credit, or the like is issued based upon at least a comparison of the logged QoS and the promised QoS for those services.

It is noted that, with respect to the above and in some embodiments, customers may directly or indirectly interface with the controller 210. Furthermore, the customer interaction may preferably be through a UE. In some aspects the customer interaction may comprise a machine-to-machine communication between a user UE and the CSM 220 based upon pre-defined parameters set on the UE, for instance by the user.

Embodiments of the present invention related to CSM and QoE management comprising closed loop QoE/QoS management will now be discussed.

In various embodiments, closed-loop management provides a mechanism by which feedback (in some aspects customer feedback) in relation to a service is taken into account when the network adjusts QoE/QoS parameters for that service. In some aspects customers, or their UE, may determine whether they are satisfied with a service level, for instance by measuring an experienced service level against a pre-determined metric, and provide QoE feedback information to the network. This feedback may be automated for example, by monitoring and feedback applications executing on a RAN or on the UE. In some aspects a local copy of a QoE policy may be established on the feedback device (i.e. the RAN or the UE), and a QoE feedback level may be determined by comparing the actual service levels experienced at the feedback location with the QoE policy. In various embodiments, the feedback may provide for a substantially timely QoS adjustment to meet an expected QoE, for example while the service is being provided rather than after the fact.

In some aspects the closed-loop management may provide for measuring QoE at a plurality of feedback locations across the network slice between the service and the customer UE. In the aspects, the controller may receive a plurality of QoE feedbacks, each corresponding to a one of the plurality of feedback locations. The controller may evaluate each of the plurality of QoE feedbacks against a QoE policy, and to adjust one or more QoS policies across the network slice in response to the plurality of QoE feedbacks. The evaluation and adjustment may continue until the plurality of QoE feedbacks meet the QoE policy. In some aspects the closed-loop management may be operative to reduce at least one QoS level within a network slice until at least one QoE feedback falls to, or meets, a QoE feedback target threshold level. In some aspects the closed-loop management may be operative to increase at least one QoS level within a network slice until at least one QoE feedback rises to, or meets, a QoE feedback minimum threshold level. Accordingly, the closed-loop management may be operative to minimize network resources expended to meet a target feedback threshold level, and/or to increase network resources expended in order to meet the QoE minimum threshold level.

Figure 3:
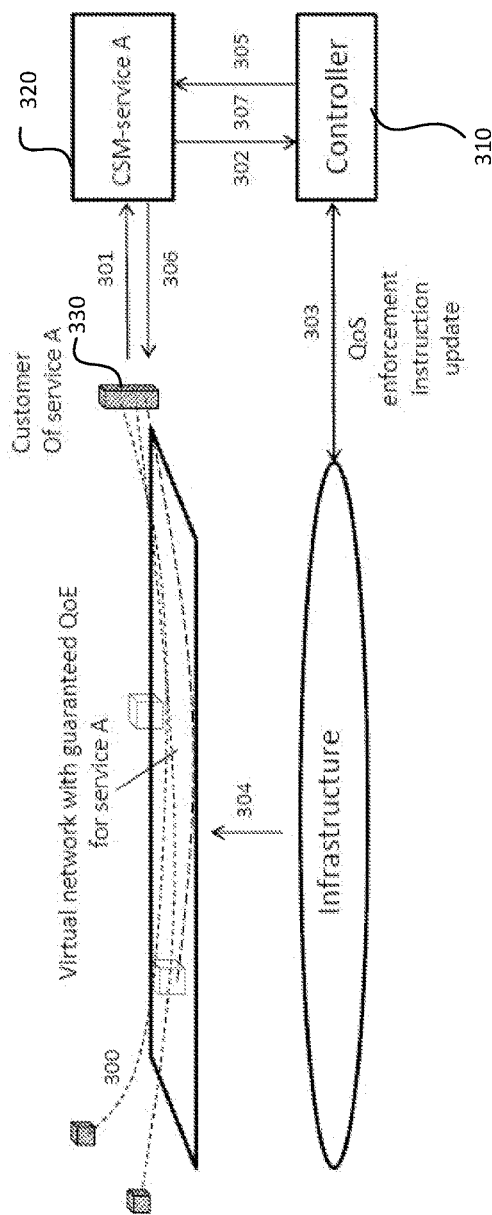
FIG. 3 illustrates a process for QoE/QoS management in accordance with embodiments of the present invention.

FIG. 3 illustrates a process for QoE/QoS management in accordance with embodiments of the present invention. The process involves the following operations, with reference numerals as denoted in FIG. 3.

In logging operation 300, a reporting device 330, which could be any of UE, v-s/u-SGW, a node, or a customer server as illustrated in FIG. 3, can log at least one of QoE/QoS/KPI (key performance indicators) information for a service (such as service A illustrated in FIG. 3). In an aspect, the reporting device 330 may compare the logged information with an established policy. For instance, a UE may log QoE information for a service and compare the logged QoE information with an expected QoE policy.

In an aspect, the reporting device 330 may further report back a result of the information logging and/or the comparison of the logged information with the established policy. For instance, the UE may report back that the logged QoE information falls below a minimum QoE level threshold set by the QoE policy. In reporting operation 301, based upon the logged at least one of QoE/QoS/KPI information, the reporting device 330 may report the logged information to the CSM 320 and/or report a result of a comparison of that logged information with the established policy. For instance, the reporting device may report to the CSM 320 in the reporting operation 301 that QoE experienced was below an expected QoE level set by the QoE policy. In some aspects, the reporting device 330 may include in the reporting operation 301 the logged QoS information. In the aspects, the CSM 320 or the controller 310 may evaluate the logged QoS information to determine whether it meets an expected QoE set by the established QoE policy.

Virtual network setup operation 302, assignment operation 303, VN operation 304, VN report operation 305, service report operation 306, and charging operation 307 correspond to operations 202 to 207 described with respect to FIG. 2, with the exception that in FIG. 3 the operations relate to updating the network infrastructure and the network slice with updated QoS instructions/policies based upon the received reporting operation 301, rather than establishing the VN from the outset. Depending upon the requirements of the update, the virtual network setup operation 302 may not be required if no changes are being made to the foundation of the virtual nodes and virtual links that make up the virtual network (network slice).

1
CSM Charging Considerations

Embodiments of the present invention related to CSM and QoE management comprise charging for a service will now be discussed.

In current 3G and 4G wireless communication networks, the legacy charging function can be characterized as being individual UE-based with a billing subscription assigned to a hardware identifier such as a SIM card. The legacy charging function is typically implemented with a static usage-based charging rule, typically based upon bit volume, or bandwidth usage. based charging rule, or a call time based charging rule for voice calls. More sophisticated charging rules allow for a flat rate on an allotment of data, with bit volume based pricing after the allotment is consumed by the device. The charging function is typically located in the PGW 21 while the UE 10 is within its home network or visiting a non-3GPP network. The charging function is typically located in the SGW 18 while the UE 10 is roaming on another 3GPP network. One skilled in the art will appreciate that this makes real-time billing difficult when the home network operator is not the network to which the UE 10 is connected. The home network operator is somewhat at the mercy of the visiting network operator to determine charging information. As network architectures evolve, it should be understood that the likelihood of a network operator relying upon connectivity from other network providers will likely increase, and thus the ability to have more accurate and timely data for UEs and other terminals connected to a $3^{rd}$ party network is of great value. The current necessity to collect billing information from each SGW 18 in order to remit billing information to a partner network is a detriment to the ability of providing real time control of network events and billing.

Embodiments of the present invention may operate on at least one of the following principles. A service-assignable customized charging function and topology may be provided. Charging may be a function of a number of parameters including one or both of bandwidth consumption and cloud resource consumption. Charging may be based upon a reserve availability of network resources that are reserved and ready to provide a network connectivity to a service. For instance, charging may be a function of resource reservations, the standby utility of the network capacity available to be accessed, with charges levied to a service account even if reserved resources are unused.

The charging policy may be negotiable between the customer and the network operator(s). For example, the policy may be service-based and consider such service factors as upload/download speed, bit volume, delay, reliability, or the like. The policy may specify a priority of data traffic being communicated between UE's accessing the service.

Data accounting may also be performed by different elements on the VN. For instance, a virtual billing entity or service-specific gateway can manage connections to the service across different infrastructure providers and accommodate connection by multiple UE's to the service, and still allow each user, device, or service to have a single billing point regardless of the infrastructure provider. Further, access network and backhaul charges may be different across an individual network slice. Accordingly, a user can choose to be billed by separate billing entities, and specify different access and backhaul entities. Further, billing can depend on whether content is on cached/stored for pre-fetched content.

In some embodiments, charging rules may be updated dynamically based on current conditions, such as network load and/or network resource availability and conditions. Charging rules may incorporate load-based billing, for example, in which costs for network resources increase with demand for said resources.

In some embodiments, one or both of a SLA (Service Level Agreement) model and a per-pay-per-service model may be implemented. As an example, a customer may wish to download a video at the price of $1 per Gb of data. In the SLA model, the general pricing and charging rule may be kept in global CSM-charging, which may be applied to services utilized through the SLA. The CSM may additionally configure the location of a per-service CSM charging control element that may be applied to individual service access. In the per-pay-per-service model, a per-service price and charging rule may be created based on the negotiation between the CSM and customer. The per-service price and charging rule may be a temporary rule, enacted when a service is accessed and deactivated when the service is terminated. In some aspects, a UE may by default operate under the SLA charging rule, but individual services may override the SLA charging rule and have the per-service price and charging rule applied for the duration of that service. Accordingly, in some aspects more than one charging rule may be applied, each affecting different service(s) being accessed by the UE.

In some embodiments of the present invention, as related to CSM and QoE management, M2M charging for services may be provided for M2M applications, with per-service price and charging rules enacted as a party engages the M2M service.

In a first representative charging scenario, exemplified in relation to charging for M2M applications, data is exchanged between a central service (e.g. a customer server available on the network) and one or more local UE's connected to the network. For instance, in an aspect the UE's may comprise utility smart meters. In an aspect, the utility smart meters may be operative to collect data and to forward the data, with or without processing at each meter location, to the customer service. In an aspect, the utility smart meters may be operative to receive data from the customer server and to change one or more operational parameters based on the received data.

In current 3G and 4G wireless communication networks, the legacy charging function would necessitate assigning charging to each utility smart meter, or their connection point to the network. Furthermore, all data exchanged by each utility smart meter would apply to that legacy charging function.

In an embodiment, a service-based billing function may be located at one or more access nodes (i.e. network gateways) in connection with the service provided by the customer server. The service-based billing function may implement a service-based charging rule to charge a customer based on a number of messages being exchanged between the central service and the UE's. Further, the service-based charging rule may be valid for a predetermined duration, or time slot. Accordingly, the customer may be charged based upon the messages sent and received from the central service, or may individually be charged for each UE that accesses the service. In either case, each UE does not need to be assigned a separate SLA for all data communicated to the network, but instead the central service can execute a single SLA and the UE's may operate under that SLA for the purpose of accessing the service. Furthermore, a UE may access more than one service, and a separate service-based charging rule may apply for each accessed service.

In an embodiment, service-based billing may be provided for one or more UE's. In an aspect, the one or more UE's may be mobile devices. In an aspect the mobile devices may comprise smartphones. The service-based billing may comprise:
   a. A pay-per-service model where a billing function is located at a v-u-SGW associated with the mobile device and/or its user, or a v-s-SGW which serves a plurality of nodes for a single service;
   b. A combination of a pay-per-service model and a conventional service level agreement based on the UE, wherein at least one of the services accessed by the UE are under the conventional service level agreement and at least one other of the services accessed by the UE are under the pay-per-service model; and,
   c. An cloud service model providing prepaid access to services, which may in some aspects include reverse charging applied to limited access services.

As illustrated in FIG. 4A, a service-based billing function 400 may be located proximate to node 410, for instance as an element executing on a processor of an access node providing network connectivity to the node 410. In the example of FIG. 4A, node 410 may be the origination/termination node acting as the original sender or final recipient of the data being exchanged (i.e. the UE). In some aspects the node 410 may provide connectivity for one or more origination/termination nodes that may access the network through the node 410. In either case, the service-based billing function 400 may be operative to evaluate the services being connected and to allocate one or more service-based charging rules corresponding to each of the connected services, and to apply each of the one or more service-based charging rules to data exchanged for that corresponding connected service.

A second representative scenario illustrated in FIG. 4B supports network information extraction. In relation to network information extraction, one or more intermediate processes 405 may be established at, or proximate to, intermediate nodes 415 on the network may be initiated to monitor data exchange on a service level. The intermediate processes 405 may further be operative to take action including, for instance, modifying existing network resources, reporting back to a controller, or reporting back to another function such as a charging function. By way of example, the intermediate processes 405 may be operative to conserve bandwidth on the network as a whole by shaping traffic on a service-level. By way of example, the intermediate processes 405 may be operative to provide congestion-based pricing by evaluating a congestion level on the network at the intermediate node 415, and to assign a congestion level to that service. The intermediate processes 405 may further be operative to report the assigned congestion level back to a service-based charging function corresponding to that service.

The second representative scenario may correspond to systems configured for network monitoring or in-network information processing, or a combination thereof. In an aspect, such systems may be, for example, sensor network applications, potentially incorporating data fusion. In this aspect, a service-based charging function may be provided at or proximate to each processing point, for example, in relation to v-s-SGWs of the services. A service-based charging rule implemented by the service-based charging function may be based for example, on the amount of cloud resource consumption plus the bit-volume or bandwidth consumed at that processing point. Further, the service-based charging rule may be valid for a predetermined duration.

Figure 4C:
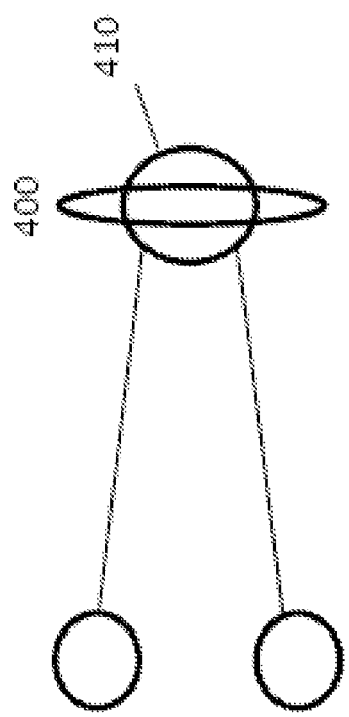
FIG. 4C illustrates placement of billing functions relative to network nodes in accordance with another embodiment of the present invention.

A third representative scenario illustrated in FIG. 4C related to charging for local measurement and control applications, for instance M2M applications for industrial control, including event monitoring and control, or the like. As illustrated in FIG. 4C, a service-based billing function 425 may be located proximate to the monitoring and/or control node 420. The monitoring and/or control node 420 in communication with sensor node 430 providing with data measurement/collection and actuator node 435 providing control actions over a process. In some aspects, the measurement/collection node 430 and the actuator node 435 may comprise a same device. In some aspects the measurement/collection node 430 and the actuator node 435 may comprise separate devices. In some aspects a plurality of sensor nodes 430 and/or control nodes 435 may be provided.

In an aspect of the third scenario a service-based charging function 425 may be provided at the v-s-SGWs which are co-located with the monitoring and/or control node 420. A service-based charging rule implemented by the service-based charging function may be based for example, on the amount of cloud resource consumption plus a commitment to ensure that the network latency for receiving information from the measurement/collection node 430 and transmitting control information to the control node 435 is below a latency threshold to permit sufficient reaction time to detect and respond to an event. The latency threshold may be based, for instance, on one or more process dynamics of the process being monitored and/or controlled. Further, in some aspects the charging rule may be valid for a predetermined duration or time of use.

For the above representative scenarios, both per-pay-per-service and SLA based charging may be supported alone or in combination.

Embodiments of the present invention, as related to CSM and QoE management, comprise charging for services provided in particular to individual mobile devices.

A first option related to charging for individual mobile devices is to support conventional service level agreements for example as in current 3G and 4G wireless communication networks.

A second option related to charging for individual mobile devices is a per-pay-per-service model. In this case, the billing function may be located at a v-u-SGW associated with the mobile device and/or its user. The service requirement and price may be generated through negotiation. In a variation of this second option, the billing function can be located at a v-s-SGW which serves a plurality of nodes for a single service. In this variation, the service requirement and pricing are negotiated with the service provider which may not necessarily be the owner of the terminal device.

A third option related to charging for individual mobile devices is a combination of the first and second options. In this case, SLA based charging may be set as the default option, with the per-pay-per-service available as an override where explicitly specified.

Embodiments of the present invention provide for a method and system for network state-based customer traffic control using Virtual Network Functions (VNFs). An infrastructure provider, or group of infrastructure providers, potentially along with one or more service providers such as Telecommunication Connectivity Service Providers, provides customers with access to network resources. The customers can represent, for example, a group of users, an organization, or a re-seller of network resources. VNs or network service slices, which rely on resources belonging to the infrastructure providers, are defined and assigned for use by the customers upon request. As such, the customers can establish their own VNs or 'Service Slices' using the resources of different third-party infrastructure providers (InPs) and/or other service providers, such as Telecom Connectivity Service Providers (TCSPs). Customers may then be viewed as VN operators, providing a service on top of third-party maintained infrastructure. Virtualization of the network functions makes it possible to instantiate and manage customer functions flexibly at various network nodes.

The infrastructure providers and/or service providers may charge their customers, in accordance with the principles of demand-based charging. That is, the charging may change dynamically over time, based on factors such as competition for resources. Charging relates to the monetary cost accrued per unit of service provided to the customer. Services may relate to various factors such as the usage of network resources, communication bandwidth used, and bits of data delivered subject to Quality of Service (QoS) requirements. It should be understood that an InP can charge a TCSP for resource usage on the basis of demand based charging. In turn, a TCSP may charge a VN for resource usage on the basis of demand based charging. It should be noted that in some aspects the charging rules of a TCSP may be demand-based for parts of the network, and not for the whole network.

Further, customers, such as VN customers, may be capable of adjusting their service requirements dynamically. Because network resources used by the customer are virtualized, dynamic adjustment of the customer's virtual network can be readily provided.

In embodiments of the present invention, the customer dynamically adjusts their service requirements in response to adjustments to the current charging policy set by the infrastructure providers and/or other service providers.

In some embodiments, if the customer's Service Level Agreement (SLA) with a provider is defined on pay-as-used basis, the customer may automatically adjust its usage of the virtual network in concert with their adjustment to service requirements. The adjustment to usage may be based on the SLA. For example, the customer may directly or indirectly control the data traffic generated by end devices using the customer's virtual network. As another example, the customer may introduce or adjust filtering functions present in the network in order to influence data traffic and/or virtual network resource usage.

Embodiments of the present invention provide a method and system addressing dynamic charging for network usage of a network service slice. Dynamic charging may assist providers or operators in being competitive while adjusting to external factors related to market-based competition for network resources. Dynamic charging may also assist the providers or operators in utilizing network resources efficiently and economically, for example by encouraging efficient resource allocations when demand is high, and leveraging demand fluctuations to improve revenue streams.

Embodiments of the present invention provide a method and system, for use by a customer, for adjusting network usage in response to dynamic charging. Traffic handled by the customer network may be decreased when dynamic charging rates increase, and increased when charging rates decrease. Reduction in traffic may be performed using approaches such as traffic prioritization and deferring of delay-tolerant traffic.

Embodiments of the present invention provide a method and system for use by a customer to dynamically monitor and/or adjust their network service requirements, specify traffic management parameters, and control the creation of the traffic generated by their end devices and/or associated applications.

Embodiments of the present invention may be used by a third-party Mobile Virtual Network Operator (MVNO) to perform dynamic charging.

Embodiments of the present invention provide a method and system for assisting a network operator to instantiate a function in the network and, knowing the traffic load, to dynamically adjust traffic charging for different network slices according to their Service Level Agreements (SLAs).

In embodiments of the present invention, there are provided methods and systems that allow a VN operator to dynamically adjust its network elements in response to changes in charging. The VN operator can make use of a Software Defined Protocol functionality to adjust how traffic is handled if network processing costs dynamically change. Traffic prioritization and limiting can also be applied to reduce network traffic if the traffic charges are increased. In the face of increased traffic charges, the VN may modify the manner in which connected devices operate, for example to delay usage of the network to a less expensive time, which will, in effect, reduce network traffic.

Embodiments of the present invention provide a method and system for re-negotiating a contract between a customer and one or more providers on an as-needed basis, based on the current dynamic charging rates and the importance of end-user device traffic at a given time.

Figure 5:
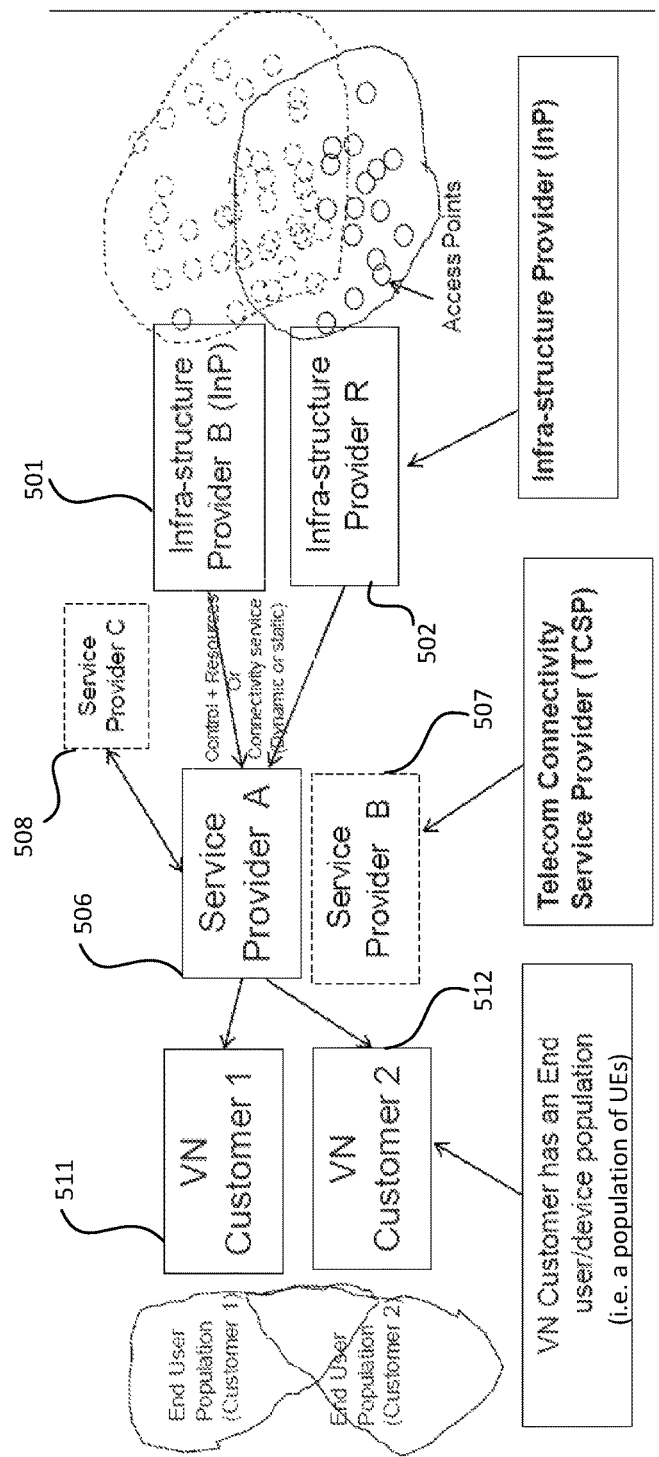
FIG. 5 illustrates a virtual network or service slice based management model in accordance with embodiments of the present invention.

FIG. 5 illustrates a high level network architecture. Instead of a set of network operators that each own infrastructure, the architecture of FIG. 5 has Infrastructure Providers (InP)s 501, 502 that own physical infrastructure. These InPs 501, 502 may also own spectrum, or in another embodiment, spectrum owners can be one or more entities which are separate from the InPs 501, 502. Telecommunication Connectivity Service Providers (TCSP)s 506, 507 obtain infrastructure from InPs 501, 502 on a wholly acquired or shared basis. An InP 501, 502 can have its resources completely dedicated to a single TCSP 506, 507, or it can sell access to a plurality of different TCSPs 506, 507. If there are a number of TCSPs 506, 507, they can be given either hard or soft slices of the InP's resources. The TCSPs 506, 507 provide connectivity services atop the InP infrastructure (and possibly over infrastructure that they themselves own) to VN customers 511, 512. The VN customers 511, 512 can also get a hard or soft slice of the resources of the TCSP 506, 507. FIG. 5 illustrates three layers of the entities, but it should be understood that further layers can be integrated depending on the implementation. In some aspects, a TCSP such as Service Provider A 507 may supply or acquire resources from another TCSP such as Service Provider C 508 illustrated in FIG. 5.

The InP 501, 502 can provide the resources and controlling technology for the Physical Layer abstractions of the communication network, which can provide a plurality of Access Nodes to the communication network, along with other infrastructure such as data link infrastructure, where required. In some embodiments, the resources and controlling technology can be dynamic or static. In some embodiments, the resources and controlling technology can be divided according to a soft allocation or a hard allocation. A hard allocation (or slice) corresponds to a particular portion of resources and controlling technologies being dedicated to a particular task. A soft allocation corresponds to a commitment that, over an identified period of time, a particular portion of resources and controlling technologies will be made available on average, but at any given time, more or less than the average may be available. In some embodiments, the InP 501, 502 can provide connectivity service in a specific geographical area.

The TCSP 506, 507 can own resources or it can use resources provided by InPs 501, 502. For example, a particular TCSP 506, 507 can own a portion of the network infrastructure that it operates and further lease additional resources, for example network infrastructure from an InP 501, 502. As would be readily understood, network infrastructure may be borrowed or leased from multiple InPs 501, 502.

Each VN customer 511, 512 can have associated therewith an end user population comprising a plurality of end user devices, for example UEs, and the VN customer 511, 512 will request particular services from the TCSP 506, 507, for enabling the connection of the UEs to the Access Points, via the network infrastructure associated with the particular TCSP 506, 507. For example, a VN customer 511, 512 can be an alarm or sensor system or company, a video distribution company, police or fire department, health monitoring company or service, or other company or service that would have associated therewith a plurality of end users.

A VN customer 511, 512 can request a service or network slice associated therewith, which is provided by the TCSP 506, 507. According to embodiments, the VN customer 511, 512 is provided with a level of dynamic control over the network traffic of the plurality of end devices associated therewith, wherein the dynamic control can be based on network operational conditions, end device location distributions, traffic generation dynamics or the like.

Embodiments of the present invention relate to a contract between a customer, such as a VN customer 511, 512, and a provider, such as a TCSP 506, 507. The contract may include or correspond to a SLA. The contract can include a dynamic charging component, in which pricing for certain specified services or levels of service changes over time, geographically, or both. Advance notification of pricing changes may be given (and in some aspects may be required). Dynamic charging can include time-of-day billing or billing by geographic region. As an example, geographic regions may be granular, such as the size of a city, a city block, or as granular as a per-access-point region. The dynamic charging can also be a function of available network capacity.

In some embodiments, in relation to the dynamic charging component, pricing may be a function of overall network conditions, such as conditions corresponding to network traffic levels. For example, when a high proportion of a service provider or infrastructure provider's network capacity is occupied, a premium may be charged to customers who wish to purchase additional network capacity (and a premium may be charged to customers who are already using the services). The cost for purchasing the use of network resources may be an increasing function of the demand for those resources. The function may be convex, concave, linear or non-linear, for example. The cost may be a function of demand in a predetermined region which is local to the customer, and different regions may correspond to different costs, for example due to differing regional demand levels. The demand for a resource during a given time interval and/or region may correspond to the proportion of those resources already in use and/or already reserved for use in that time interval and/or region. Different types of traffic may be subject to different dynamic pricing changes.

Embodiments of the present invention address situations in which the contract between a customer and provider incorporates a dynamic charging model, in which network operators can adjust the charges levied based on a given set of criteria, such as competition or network loading criteria. In particular, embodiments of the present invention may provide a facility for responding to such charging adjustments.

In a first scenario corresponding to embodiments of the present invention, the contract between customer and provider may automatically be re-negotiated in response to a charging adjustment. Re-negotiation may include actions to adjust the customer's own end-user requirements, adjust network Key Performance Indicators (KPIs), and adjust a charging profile by which downstream customers (e.g. end users if the re-negotiation is between a TCSP and VN) are charged. Additionally, or alternatively, re-negotiation may include taking actions to limit the customer's traffic in accordance with a re-negotiated traffic profile.

In a second scenario corresponding to embodiments of the present invention, the contract between customer and provider may include what is referred to herein as a "pay for usage (network)" service package. In such a contract, the customer is charged for each connectivity service being generated, for example by the customer's end users. The price for a service may again be an increasing function of the current demand for that service.

In some embodiments, when the contract includes a "pay for usage (network)" service package, the customer's end users may not provide sufficient traffic for a change to be justified.

In some embodiments corresponding to the second scenario, when the contract includes a "pay for usage (network)" service package, the customer may sell network services to its own customers. For example, the customer may be a service re-seller or partner service provider. The document "NGMN 5G White Paper," by the Next Generation Mobile Network Alliance, dated Feb. 17, 2015, provides example details of potentially relevant business models. In such a scenario, when network charges are high, embodiments of the present invention may be configured to inhibit end users from running low-priority services such as designated "best-effort" services. Inhibiting use of a service may involve, for example, increasing the price of the service, filtering, throttling or blocking the service. Entities in the network may be requested to limit the amount of best-effort traffic being generated. In some embodiments, SLAs between the customer and end users may specify that such limitations may be imposed, as well as conditions under which they are imposed. Additionally, or alternatively, a slice-specific Dynamic Charging Handler (DCH) maintained by the CSM of the TCSP 506, 507 may be configured by the VN customer 506, 507 to provide feedback to the VN customer 506, 506 to take charging related action. For instance, in an aspect, the DCH may instruct the VN customer 506, 506 to consider increasing the charges levied on end users in order to recover costs. Additionally, or alternatively, in some aspects the DCH may include a pre-determined function set by the VN customer 506, 507 to control or prioritize between different services. In an aspect the network traffic treatment may be adjusted and the total traffic in a geographic region impacted by high charges may be limited by the DCH sending a traffic treatment message with appropriate corresponding parameter adjustment to a network controller.

In other embodiments corresponding to the second scenario, when the contract includes a "pay for usage (network)" service package, the customer may have its own vertical applications running on the network. This may be the case for a Machine-to-Machine (M2M) customer operating a number of separate M2M devices, or an organization having many employees or associates, for example. In this case, the present invention may be configured to reduce network usage as prices for network services increase. Reduction in network usage may involve inhibiting or deferring network traffic. This may be particularly feasible when the network traffic is delay-tolerant, such as in the case of meter or sensor readings transmitted from M2M devices. Reducing network usage may include inhibiting low-priority services, such as best-effort services. As prices for network services decrease, low-priority bulk traffic may be transmitted. Such traffic may include, for example, administration information, data corresponding to content backup operations, data scanning, and sharing of stored historical data. In an aspect, the DCH may be operative, based upon pre-determined parameters set by the VN customer 506, 507, to send a message to UEs to limit or delay their traffic generation.

Various implementation details related to dynamic charging are described below.

In various embodiments, for either of the above-noted first scenario or second scenario, a dynamic charging function trigger is provided. The dynamic charging function trigger may be associated with a dynamic charging function or module provided in the network. The dynamic charging function or module is configured to determine charging rates for specified geographic regions and times. The trigger may be configured to invoke the dynamic charging function or module in response to information indicative of a traffic event. To this end, the trigger may be based on data from traffic monitoring functions in one or more different geographic regions of the network and/or from traffic monitoring functions related to specific network slices. The data from such monitoring functions may be indicative of current and/or predicted traffic levels in specified portions of the network.

The trigger may additionally or alternatively be based on data indicative of competitor pricing in the marketplace. For example, such data may be obtained, by the Global Customer Service Management function (G-CSM) of the network, from external network charging databases. The competitors may include entities that compete to sell services to the customer, such as other TCSPs or InPs. Changes to competitor pricing may trigger a change to customer behaviour and/or pricing.

The trigger may additionally or alternatively be based on data indicative of predicted changes to network traffic levels in the future. The predictions may be provided for the relatively near future and may be based on observations of historical traffic level and/or pricing data.

The trigger may additionally or alternatively be based on data indicative of other contextual information, such as information indicative of public events in a relevant geographic area, or patterns of network usage or user behaviours in the area for example related to commuting habits or work habits. For M2M devices, contextual information may relate to schedules such as billing and meter reading schedules, sensor reading schedules, or device update schedules.

In various embodiments, for example in response to invocation of the dynamic charging function or module by the dynamic charging function trigger, dynamic charging may be configured to determine current network usage charging policies. A policy may relate for example to a set of monetary charges levied per unit of a corresponding set of specified network resources used during a specified time period and portion of the network or geographic region. The dynamic charging function or module may further be configured to communicate changes to the network usage charging policies. The changes may be communicated to one or more customers. For example, the changes may be communicated to a Customer Service Module (CSM) residing in a network slice holding a customer's virtual network.

Embodiments of the present invention comprise a customer-controlled Dynamic Charging Handler (DCH) function or module which is configured to determine actions to be taken by the customer in response to a notification of a change to the current network usage charging policy. The DCH may be configured by the customer using configuration options to select appropriate actions to take depending on parameters such as the charging model specified by the SLA, the customer's preferences, or which of the above-described first scenario or second scenario is applicable. The actions taken can include, for example, actions taken to limit network traffic triggered by end users of the customer's network, re-negotiation of the contract between customer and service provider, limiting or filtering certain types of end-user traffic, adjusting SLA parameters, and adjusting QoS parameters.

In some embodiments, for example in the case of an above-discussed scenario, re-negotiation of the contract between customer and service provider may be initiated by the customer-controlled DCH. The contract being re-negotiated may be only a portion of a larger contract in place, and may correspond to the SLA portion of the contact, for example. As will be appreciated, the contract re-negotiation may take place as between devices based upon pre-determined charging and data usage parameters set by each of the customer and the service provider. At the conclusion of the contract re-negotiation, the customer may receive feedback from the DCH to apply towards its charging policies as applied to its end customers.

In some embodiments, re-negotiation of the contract may be initiated only if changes in the charging policy exceed a predetermined threshold. The threshold may be set to a zero value or a non-zero value. Otherwise, when the changes in the charging policy are below the threshold, the DCH may be configured to control its network demands so as to limit charges incurred. Network demands can be controlled for example by controlling certain types of network traffic, prioritizing certain types of network traffic over others, or limiting or inhibiting certain devices from generating certain types of traffic. The DCH may initiate the transmission of control messages to targeted end-user devices in order to control the network demands. For example, the control message may indicate that end user devices should refrain from or defer transmission of certain specified types of data messages. The DCH may further be configured to transmit a traffic treatment message, including appropriate parameters, to the network controller.

In some embodiments, when the changes in the charging policy are above the threshold, the DCH may transmit a message to the customer to initiate re-negotiation of the contract. The customer may respond by adjusting SLA requirements. Additionally, the DCH may further be configured to transmit a traffic treatment message, including appropriate parameters, to the network controller.

In some embodiments, when the SLA requirements are reduced, different types of network traffic can be prioritized or de-prioritized in order to maintain operational standards under the new SLA requirements in place. The prioritized traffic may thus experience less decrease in traffic quality at the expense of the de-prioritized traffic. Prioritization may be applied on the basis of type of traffic and/or type of device from which or to which the traffic flows.

In some embodiments, when the SLA requirements are reduced, certain types of devices may be requested to refrain from or defer generation of certain types of traffic in the network. Generation of uplink traffic may be inhibited by instructing classes of devices to refrain from certain types of transmissions. Generation of downlink traffic may be inhibited by causing the devices to refrain from requesting content or information over the network.

In some embodiments, when the SLA requirements are increased, for example due to a reduction in the monetary charges levied per unit of network resource, lower-priority services may be activated, or traffic restrictions may be relaxed. Lower-priority services may include, for example, administration operations, data backups, virus checking operations, delay-tolerant messaging, or best-effort traffic.

In some embodiments, for example in the case of the second scenario discussed above, the DCH may include a customer-controlled function configured to determine a traffic control decision, for example indicative of how to prioritize traffic and which traffic to inhibit or allow. Upon receiving an indication of a change in the charging policy, the DCH is configured to invoke the customer-controlled function, which in turn determines how to control the traffic. The device traffic controller is then instructed to control the network traffic according to the determination, via control messaging. In various embodiments, the DCH function may be configured to instruct network controller to change network traffic prioritizations according to the determination made by the customer-controlled function.

In an implementation, a dynamic charging handler function may be operative to provide dynamic charging in a network by: receiving an indication of a dynamic change to charging; and, instructing an end-device to adjust traffic-generating behaviour in accordance with the received change to dynamic charging, based upon a customer-defined configuration option. The customer-defined configuration option may be selected by an end user, and forwarded to the dynamic handler function by a customer device. The dynamic handler function may receive the customer-defined configuration operation while providing dynamic charging, or at some time before it provides the dynamic handling. In some cases the customer-defined configuration operation may be updated during dynamic charging as soon as it is received by the dynamic handler function. The end-device may be instructed by providing instructions to a device traffic controller, and the device traffic controller informing the at least one end-device of the instructions. The adjustment to traffic-generating behaviour may include rejecting or de-prioritizing identified traffic types generated by the at least one end-device. In an aspect, the rejection or de-prioritization may occur at the end-device before transmission. In an aspect, the rejection or de-prioritization may occur at the device traffic controller.

In an aspect, the one or more customer-defined configuration options may include parameters based upon a Service Level Agreement agreed to between the end user and the service provider.

In an aspect, the dynamic charging handler function may be operative to instruct the at least one end-device to adjust traffic generating behaviour by dynamically adjusting network resource usage by the end-device. Before the dynamic charging handler function instructs the at least one end-device, it may contact a customer associated with the one or more customer-defined configuration options and request that the customer re-negotiate a contract between the customer and an operator of the network. The customer may be a custodian computing device enabled to re-negotiate the contract on behalf of the end user based upon one or more user selectable parameters. The parameters may include, for instance, a maximum price per data unit.

The change to dynamic charging may occur upon receipt of a dynamic charging function trigger. The dynamic charging function trigger can include, for instance; a specified time period; a specified geographic region including the at least one end-device; a current network usage charging policy; a current network usage; and/or an amount of data consumed by the at least one end-device. The dynamic charging function trigger may be sent to the dynamic charging handler function based upon data indicative of: competitor pricing; predicted network traffic levels; current network traffic levels; and/or, end-device historical usage patterns.

Figure 6:
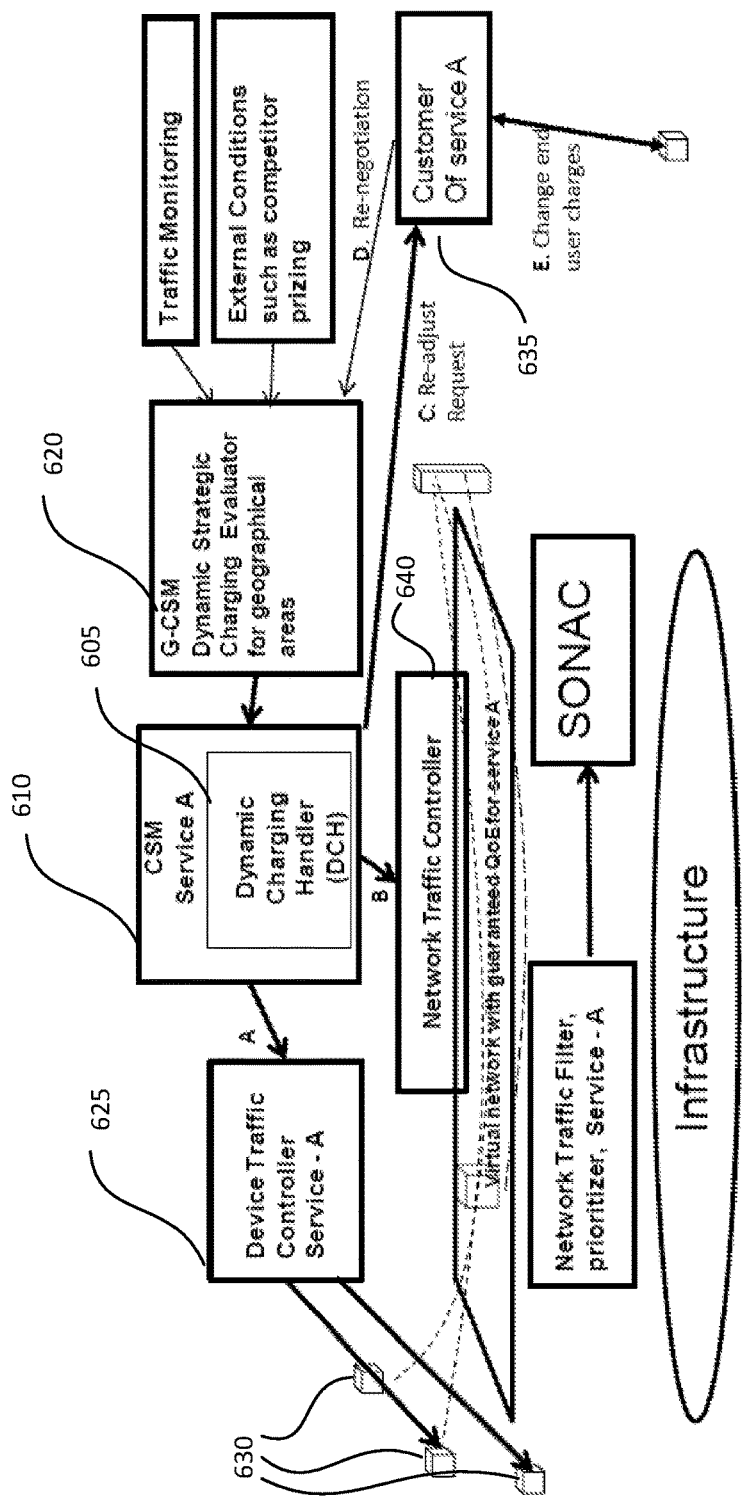
FIG. 6 illustrates control of traffic generation in accordance with an embodiment of the present invention.

FIG. 6 illustrates control of traffic generation in accordance with an embodiment of the present invention. A DCH function 605 resides in the CSM service 610 and is configured to perform one or more of the following actions, for example upon receiving explicit or implicit direction from the customer 635. The DCH 605 may be configured to (A) instruct end-devices 630 (i.e. UEs) or associated users to adjust traffic-generating behaviours and/or to temporarily stop data transmissions from certain identified devices or types of devices. This instruction may be provided from the DCH 605 to the device traffic controller 625, which in turn informs the appropriate end-devices 630 of the instructions. The DCH 605 may be configured to (B) provide instructions to the network traffic controller 640, the instructions indicative that the network traffic controller 640 should not accept certain identified traffic types, or should de-prioritize the identified traffic types. The DCH 605 may be configured to (C) contact the customer 635 and request that the customer re-negotiates the contract with its service providers and/or request that the customer 635 adjusts its contracts with its own end users or other customers. Re-negotiation (D) may then occur between the customer 635 and the G-CSM 620. Changing (E) the contract, such as end user charges, occurs between a module belonging to the customer 635 and the end users.

Figure 7:
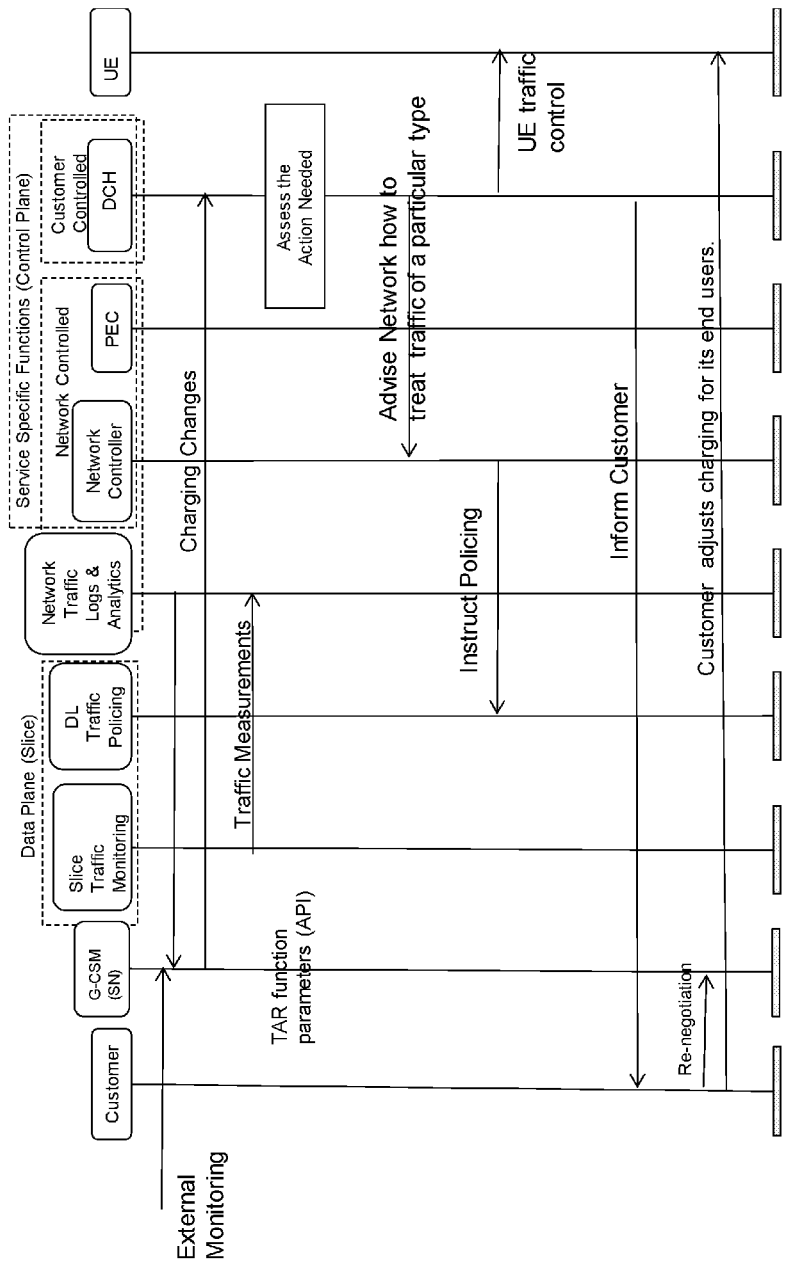
FIG. 7 illustrates network slice traffic management signaling flow in accordance with an embodiment of the present invention.

FIG. 7 illustrates network slice traffic management signaling flow in accordance with an embodiment of the present invention. Initially, a message is received by the G-CSM. The message may indicate a change to dynamic charging which involves the customer. The message may be received from an external monitoring function or from a Network Traffic Logging and Analytics function. When the Network Traffic Logging and Analytics function generates the message, it may do so on the basis of traffic measurements received from the Slice Traffic Monitoring function residing in the data plane of the network slice. In response, the G-CSM transmits a message to the customer-controlled DCH indicative of the changes to dynamic charging. The DCH then determines an action to be taken in response to the changes, such as contract re-negotiation and/or adjustments to network traffic.

In some embodiments, when the action to be taken involves making adjustments to network traffic, the DCH informs the Network Controller of a particular manner in which to treat particular types of traffic. The Network Controller may further instruct the Downlink Traffic Policing function to police downlink traffic according to the information provided by the DCH. Traffic policing and/or traffic control may include, for example, rate limiting, changes to traffic prioritization, filtering, blocking, or throttling.

In some embodiments, when the action to be taken involves making adjustments to network traffic, the DCH transmits a traffic control message to one or more UEs of the customer-controlled network. For example, the traffic control message may instruct the UE to refrain from generating one or more specified types of traffic, or to buffer one or more specified types of traffic for transmission at a later (lower cost) time.

In some embodiments, when the action to be taken involves contract re-negotiation, the DCH transmits a message to the customer informing the customer that contract re-negotiation should be commenced. The message may be received and handled on behalf of the customer by an automated function or module. Re-negotiation may take place between the customer and the G-CSM. Following re-negotiation, the customer may transmit a message to its end-user UEs indicative of adjustments to the customer's charging policy levied for services provided to the UEs. As such, the customer can pass on price increases or decreases to its end users.

In the embodiment of FIG. 7, the Slice Traffic Monitoring function and DL Traffic Policing function reside in the data plane, the Network Traffic Logging and Analytics function, the Network Controller and the Policy Enforcement and Control function are network controlled, and the Network Controller, the Policy Enforcement and Control function and the DCH reside in the control plane.

In the above, it should be noted that functions and modules may be given different names and instantiated in different ways. A given function may be merged or integrated with one or more other functions. A given function may be provided by cooperation of multiple separate functional elements.

It will be readily understood that, throughout the preceding discussion, the above-described network functionalities and operations may correspond to a method for use in supporting operation a communication network, such as a 5G wireless communication network. The method may involve computer-implemented functions, namely functions which are implemented by one or more computing, communication and/or memory components of the network infrastructure. These components may take various forms, such as specific servers or general-purpose computing, communication and/or memory devices which are configured to provide the required functionality through virtualization technologies. The method may involve the operation of one or more network components in order to improve the operation of the network. As such, with the communication network viewed as an apparatus, embodiments of the present invention may be directed to improving internal operations of the communication network.

Further, it will be readily understood that embodiments of the present invention relate to a communication network system or associated apparatus thereof, which is configured to perform the above-described network functionalities and operations. Again, the system or apparatus may comprise one or more computing, communication and/or memory components of the network infrastructure, which may take various forms, such as specific servers or general-purpose computing, communication and/or memory devices which are configured to provide the required functionality through virtualization technologies. Various methods as disclosed herein may be implemented on one or more real or virtual computing devices, such as devices within a communication network control plane, devices operating in the data plane, or a combination thereof. Computing devices used to implement method operations may include a processor operatively coupled to memory, the memory providing instructions for execution by the processor to perform the method as described herein.

Various embodiments of the present invention utilize real and/or virtual computer resources. Such computer resources utilize, at a hardware level, a set of one or more microprocessors operatively coupled to a corresponding set of memory components which include stored program instructions for execution by the microprocessors. Computing resources may be used to provide virtual computing resources at one or more levels of virtualization. For example, one or more given generic computer hardware platforms may be used to provide one or more virtual computing machines. Computer hardware, such as processor resources, memory, and the like, may also be virtualized in order to provide resources from which further virtual computing machines are built. A set of computing resources which are allocatable for providing various computing resources which in turn are used to realize various computing components of a system, may be regarded as providing a distributed computing system, the internal architecture of which may be configured in various ways.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for providing dynamic charging in a network slice, the method comprising, by a dynamic charging handler function:
   receiving an indication, from a provider of underlying network services, of a dynamic change to a pre-existing charging rate for the network slice; and
   in response to receipt of the indication, transmitting an instruction to adjust traffic patterns on network resources allocated for the network slice, and associated with the received indication in accordance with the received dynamic change, the instruction transmitted towards a destination, the instruction determined based on a configuration option defined by a customer, the traffic patterns being specific to generation and handling of network traffic flowing to, from, or both to and from a plurality of end-devices owned or served by the customer.

2. The method of claim 1, wherein the customer-defined configuration option includes parameters based upon a Service Level Agreement.

3. The method of claim 1, wherein the destination of the instruction is determined to be at least one end-device, and the instruction instructs the at least one end-device to adjust traffic generating behaviour or to stop data transmissions on the network slice.

4. The method of claim 1, wherein before the dynamic charging handler function transmits the instruction, the method further comprises, by the dynamic charging handler function:
   contacting a customer associated with the customer-defined configuration option and requesting that the customer re-negotiate a contract between the customer and an operator of the network.

5. The method of claim 3, wherein the destination of the instruction is determined to be a device traffic controller, the instruction causing the device traffic controller to cause at least one end-device to adjust traffic generating behavior or to stop data transmissions on the network slice.

6. The method of claim 1, wherein the destination of the instruction is determined to be a network traffic controller, and the instruction instructs the network traffic controller to reject or de-prioritize identified traffic types on the network slice.

7. The method of claim 1, wherein the receipt of the indication of the dynamic change to the pre-existing charging rate comprises receipt of a dynamic charging function trigger, the dynamic charging function trigger comprises one of:
   a specified time period;
   a specified geographic region including the at least one end-device;
   a current network usage charging policy;
   a current network usage; and/or
   an amount of data consumed by the at least one end-device.

8. The method of claim 7, wherein the dynamic charging function trigger is sent to the dynamic charging handler function based upon data indicative of:
   competitor pricing;
   predicted network traffic levels;
   current network traffic levels; and/or,
   end-device historical usage patterns.

9. The method of claim 1, wherein a charging rate for the network slice following the dynamic change to the pre-existing charging rate is different from dynamic charging rates for other network slices allocated by the provider of underlying network services.

10. A networked apparatus comprising a processor operatively coupled to memory and configured to implement a dynamic charging handler function operative to:
    receive an indication, from a provider of underlying network services, of a dynamic change to a pre-existing charging rate for the network slice; and
    in response to receipt of the indication, transmit an instruction to adjust traffic patterns on network resources allocated for the network slice, and associated with the received indication in accordance with the received dynamic change, the instruction transmitted towards a destination, the instruction determined based on a configuration option defined by a customer, the traffic patterns being specific to generation and handling of network traffic flowing to, from, or both to and from a plurality of end-devices owned or served by the customer.

11. The apparatus of claim 10, wherein the customer-defined configuration option includes parameters based upon a Service Level Agreement.

12. The apparatus of claim 10, wherein the destination of the instruction is determined to be at least one end-device, and the instruction instructs the at least one end-device to adjust traffic generating behaviour or to stop data transmissions on the network slice.

13. The apparatus of claim 12, wherein the destination of the instruction is determined to be a device traffic controller, the instruction causing the device traffic controller to cause at least one end-device to adjust traffic generating behavior or to stop data transmissions on the network slice.

14. The apparatus of claim 10, wherein before the dynamic charging handler function transmits the instruction, the dynamic charging handler function is further operative to:

contact a customer associated with the customer-defined configuration option and requesting that the customer re-negotiate a contract between the customer and an operator of the network.

15. The apparatus of claim 10, wherein the destination of the instruction is determined to be a network traffic controller, and the instruction instructs the network traffic controller to reject or de-prioritize identified traffic types on the network slice.

16. The apparatus of claim 10, wherein the receipt of the indication of the dynamic change to the pre-existing charging rate comprises receipt of a dynamic charging function trigger, the dynamic charging function trigger comprises one of:

a specified time period;
a specified geographic region including the at least one end-device;
a current network usage charging policy;
a current network usage; and/or
an amount of data consumed by the at least one end-device.

17. The apparatus of claim 16, wherein the dynamic charging function trigger is sent to the dynamic charging handler function based upon data indicative of:

competitor pricing;
predicted network traffic levels;
current network traffic levels; and/or,
end-device historical usage patterns.

18. The apparatus of claim 10, wherein a charging rate for the network slice following the dynamic change to the pre-existing charging rate is different from dynamic charging rates for other network slices allocated by the provider of underlying network services.

19. A non-transitory computer readable medium containing program instructions for causing a networked computing apparatus to perform, by a dynamic charging handler function:

receiving an indication, from a provider of underlying network services, of a dynamic change to a pre-existing charging rate for the network slice; and in response to receipt of the indication, transmitting an instruction to adjust traffic patterns on network resources allocated for the network slice, and associated with the received indication in accordance with the received dynamic change, the instruction transmitted towards a destination, the instruction determined based on a configuration option defined by a customer, the traffic patterns being specific to generation and handling of network traffic flowing to, from, or both to and from a plurality of end-devices owned or served by the customer.

* * * * *